United States Patent
Iwamoto et al.

(10) Patent No.: US 10,247,926 B2
(45) Date of Patent: Apr. 2, 2019

(54) OPTICAL SYSTEM AND OPTICAL APPARATUS INCLUDING THE SAME

(71) Applicant: CANON KABUSHIKI KAISHA, Tokyo (JP)

(72) Inventors: Shunji Iwamoto, Utsunomiya (JP); Shinichiro Saito, Utsunomiya (JP); Satoshi Maetaki, Utsonomiya (JP); Takahiro Hatada, Utsunomiya (JP); Suguru Inoue, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 15/706,986

(22) Filed: Sep. 18, 2017

(65) Prior Publication Data
US 2018/0095254 A1  Apr. 5, 2018

(30) Foreign Application Priority Data

Sep. 30, 2016  (JP) .................. 2016-193119

(51) Int. Cl.
  *G02B 13/18* (2006.01)
  *G02B 15/15* (2006.01)
  *G02B 15/177* (2006.01)
  *H04N 5/225* (2006.01)

(52) U.S. Cl.
  CPC ............. *G02B 13/18* (2013.01); *G02B 15/15* (2013.01); *G02B 15/177* (2013.01); *H04N 5/2254* (2013.01)

(58) Field of Classification Search
CPC ....... G02B 13/18; G02B 15/15; H04N 5/2254
See application file for complete search history.

(56) References Cited

U.S. PATENT DOCUMENTS

| 5,952,256 A | 9/1999 | Morishita et al. |
| 2016/0077309 A1 | 3/2016 | Ohashi et al. |

FOREIGN PATENT DOCUMENTS

| JP | 6-135738 A | 5/1994 |
| JP | 10-265238 A | 10/1998 |
| JP | 2015-215557 A | 12/2015 |

*Primary Examiner* — Jack Dinh
(74) *Attorney, Agent, or Firm* — Canon USA Inc., IP Division

(57) ABSTRACT

An optical system includes an optical element. When the optical element is disposed on a magnification side with respect to an intersection point between an optical axis and a chief paraxial ray, the optical element is a positive lens. When the optical element is disposed on a reduction side with respect to the intersection point, the optical element is a negative lens. The optical element satisfies all of the following conditional expressions:

$$30 \leq vd \leq 40$$

$$1.225 \leq [nd-(14.387/vd)] \leq 1.276$$

$$0.4300 \leq [\theta gF-(2.9795/vd)] \leq 0.5010$$

where $vd$ is Abbe number of the optical element, $\theta gF$ is a partial dispersion ratio of the optical element for g-line and F-line, and $nd$ is a refractive index of the optical element for d-line.

11 Claims, 18 Drawing Sheets

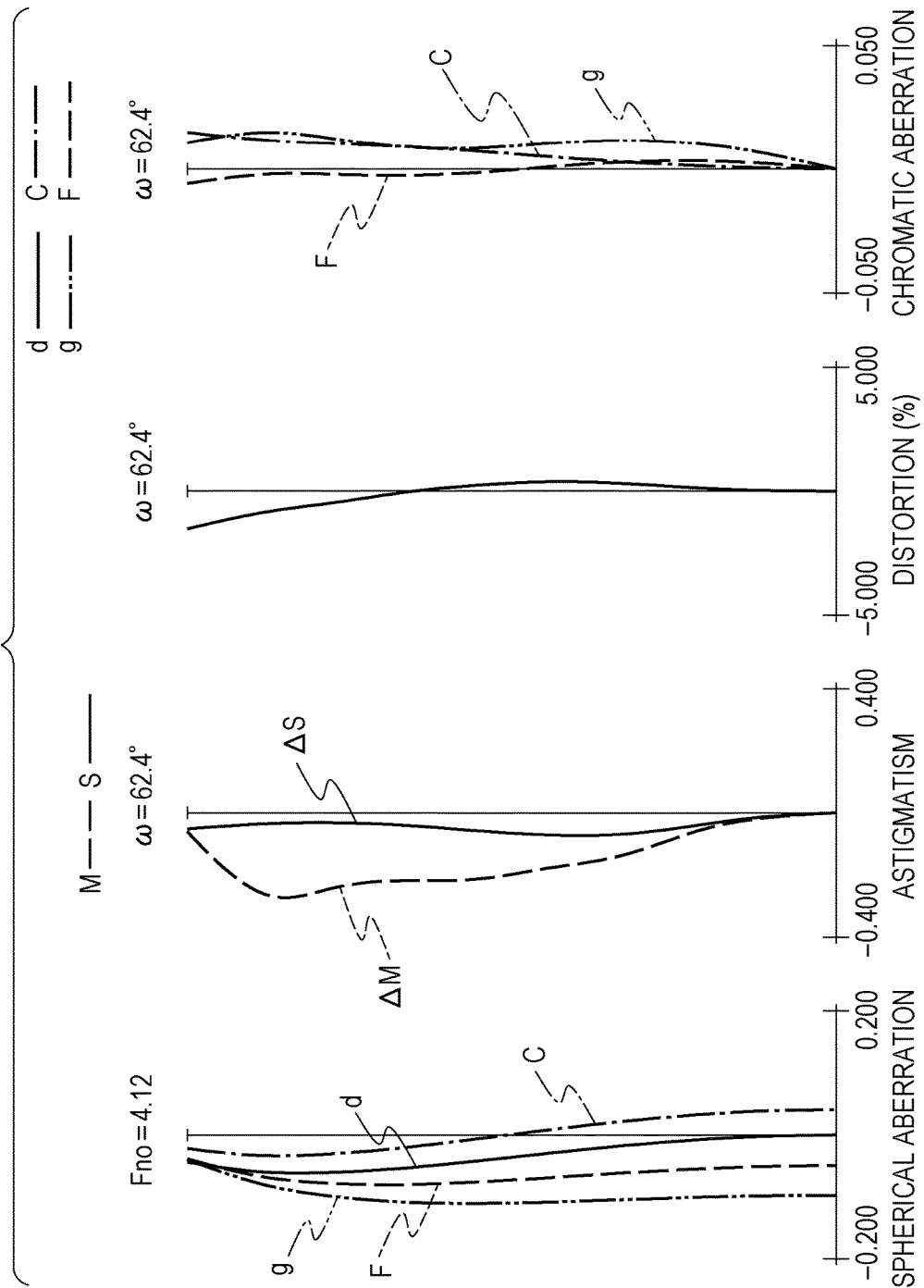

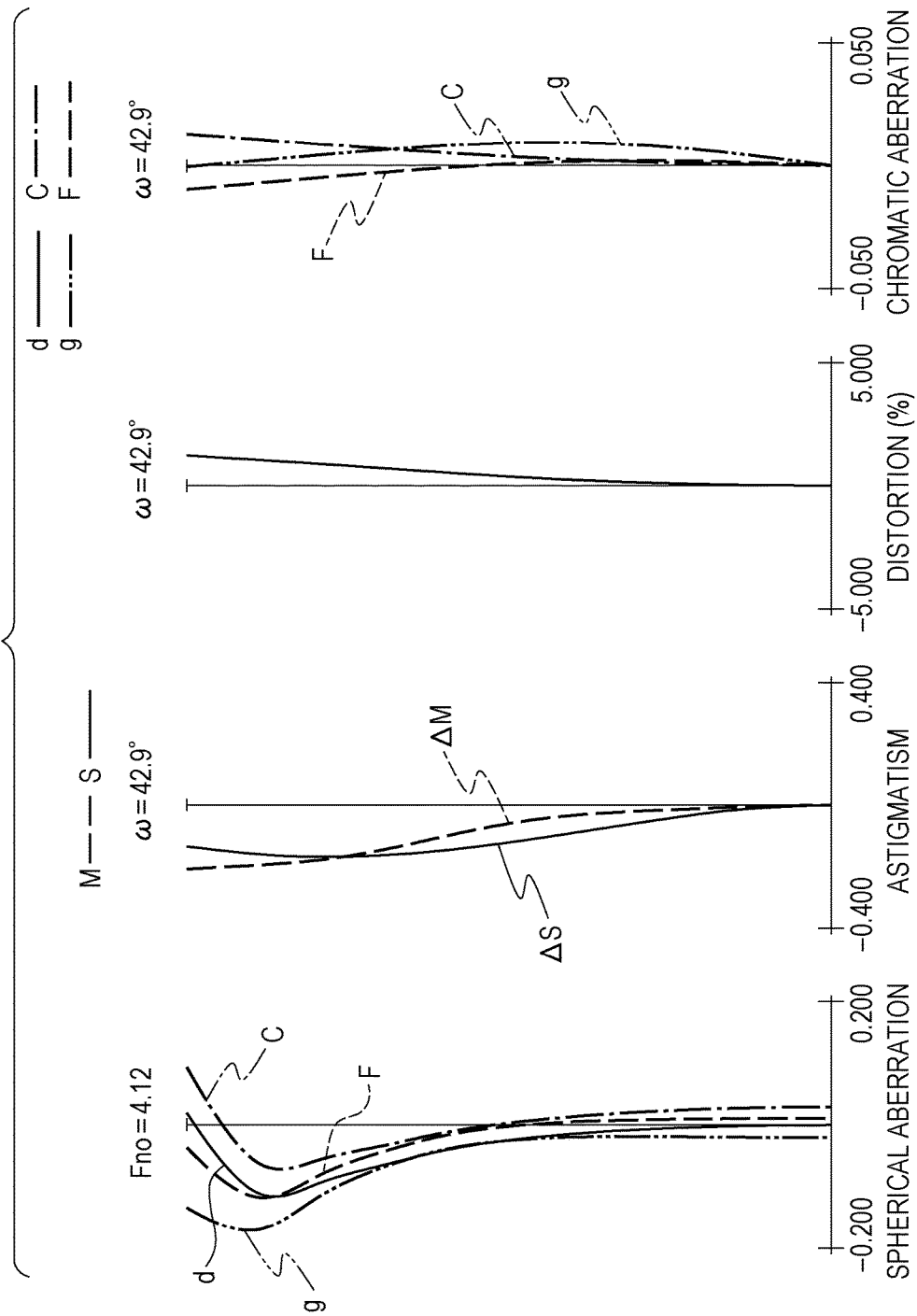

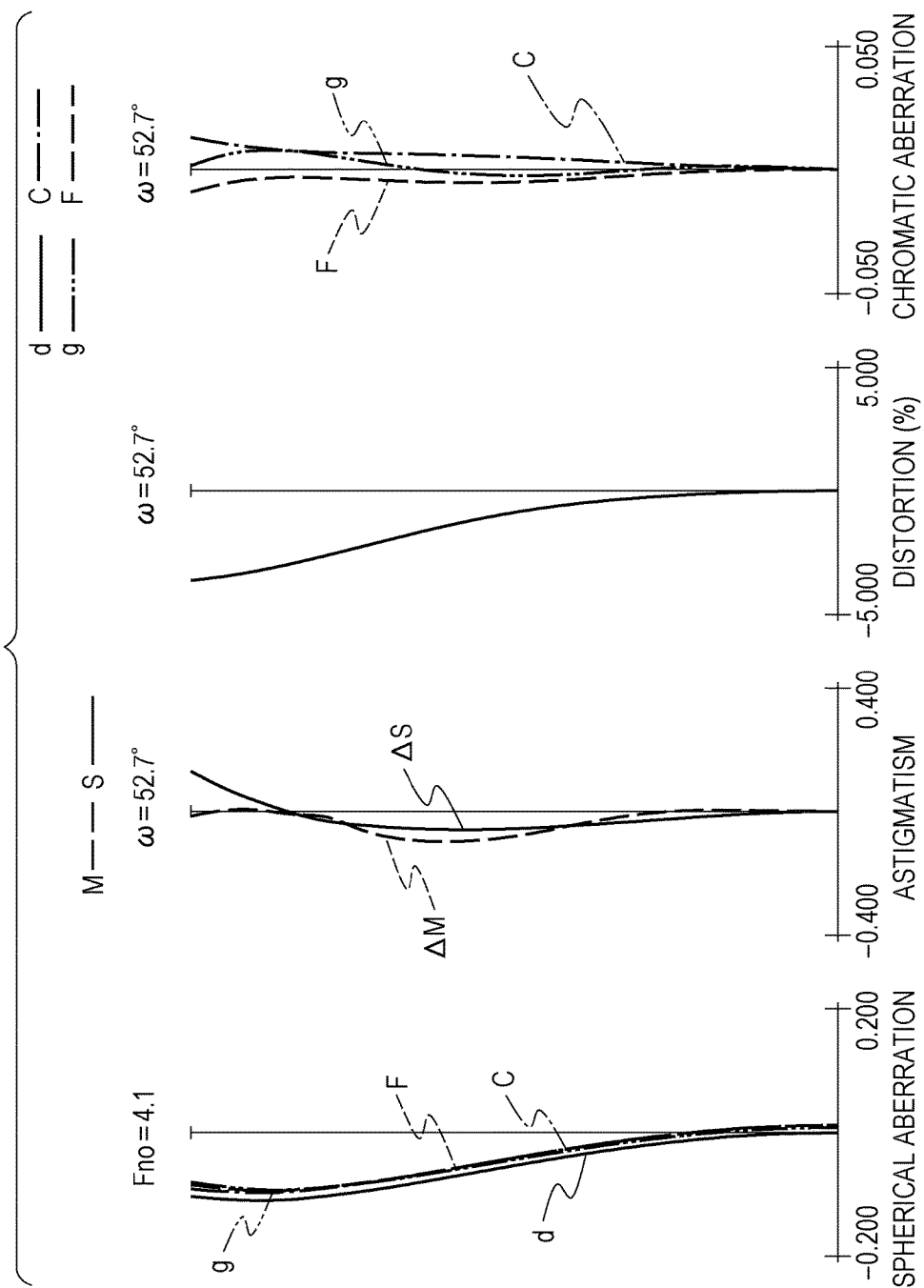

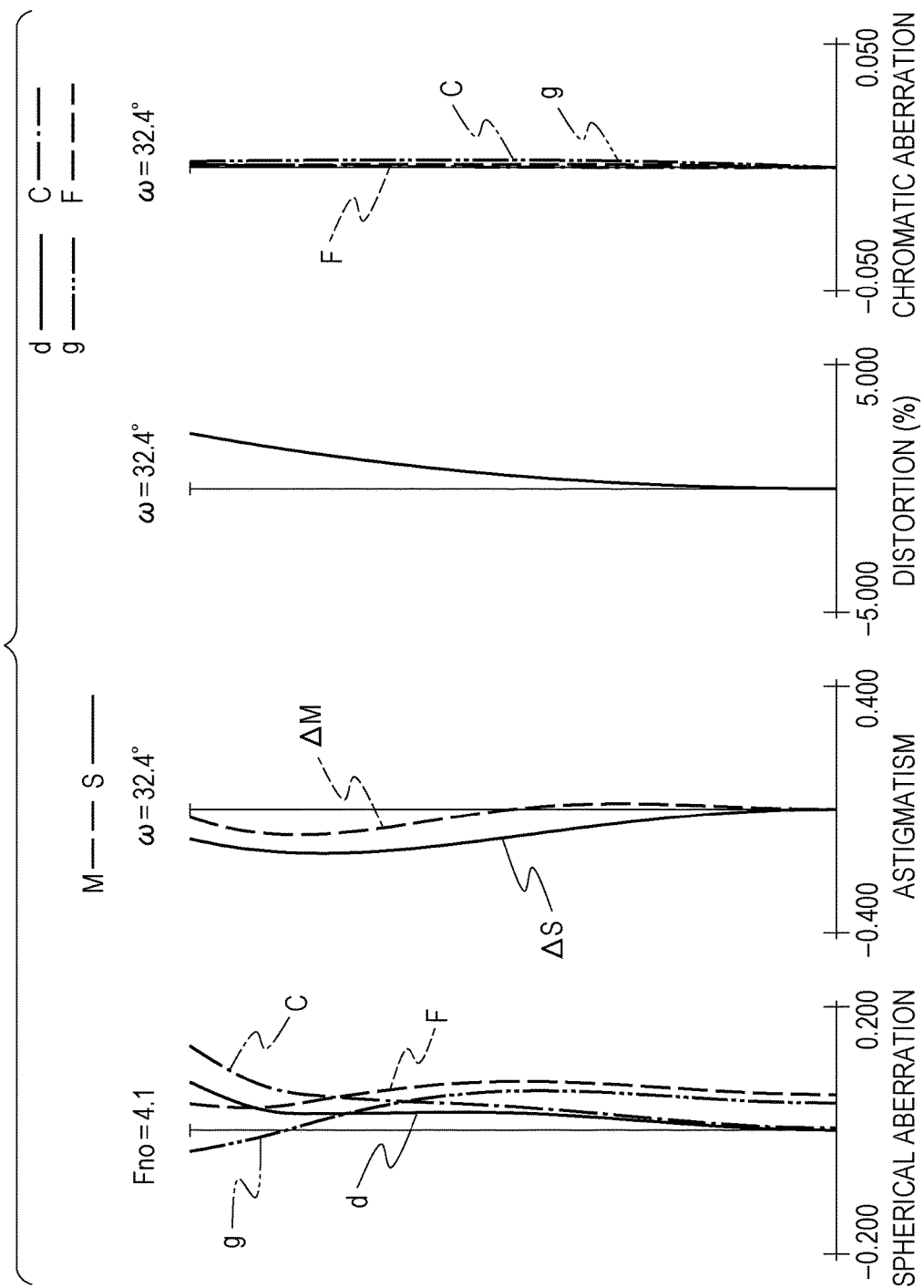

OPTICAL SYSTEM AND OPTICAL APPARATUS INCLUDING THE SAME

BACKGROUND OF THE INVENTION

Field of the Invention

The present disclosure relates to optical systems, and in particular, to an optical system suitable for optical apparatuses, such as digital video cameras, broadcasting cameras, silver-halide-film cameras, and monitoring cameras.

Description of Related Art

It is known in the art that chromatic aberration of magnification (also known as transverse or lateral chromatic aberration) is larger than axial chromatic aberration in retro focus type optical systems. A known method for correcting the chromatic aberration in a wide wavelength range is to use an optical material that exhibits large dispersion and anomalous partial dispersibility.

Japanese Patent Application Laid-Open No. 10-265238 discloses optical glass that exhibits high dispersion and negative anomalous partial dispersibility.

SUMMARY OF THE INVENTION

The present disclosure provides an optical system in which chromatic aberration of magnification and field curvature are corrected.

According to an aspect of the present disclosure, an optical system is provided in which a distance from a position where a paraxial marginal ray enters a lens surface closest to a magnification side to an optical axis is smaller than a maximum value of a distance from a position where the paraxial marginal ray enters a lens surface on a reduction side with respect to an intersection point P between the optical axis and a chief paraxial ray to the optical axis. The optical system includes an optical element wherein following conditional expressions are satisfied:

$$30 \leq vd \leq 40$$

$$1.225 \leq [nd-(14.387/vd)] \leq 1.276$$

$$0.4300 \leq [\theta gF-(2.9795/vd)] \leq 0.5010$$

where $vd$ is Abbe number of the optical element, $\theta gF$ is a partial dispersion ratio of the optical element for g-line and F-line, and $nd$ is a refractive index of the optical element for d-line. When the optical element is disposed on the magnification side with respect to the point P, the optical element is a positive lens. When the optical element is disposed on the reduction side with respect to the point P, the optical element is a negative lens.

Further features of the present invention will become apparent from the following description of exemplary embodiments with reference to the attached drawings.

BRIEF DESCRIPTION OF THE DRAWINGS

FIG. 10A is an aberration diagram of the optical system according to the fifth embodiment at a wide angle end.

FIG. 10C is an aberration diagram of the optical system according to the fifth embodiment at a telephoto end.

FIG. 12A is an aberration diagram of the optical system according to the sixth embodiment at a wide angle end.

FIG. 12C is an aberration diagram of the optical system according to the sixth embodiment at a telephoto end.

DESCRIPTION OF THE EMBODIMENTS

Optical systems according to embodiments of the present disclosure and optical apparatuses including the same will be described hereinbelow. The optical systems according to the embodiments are image-taking lens systems for use in image pickup apparatuses, such as digital still cameras, digital video cameras, broadcasting cameras, silver-halide cameras, and monitoring cameras. The optical systems according to the embodiments can also be used as projection optical systems for projectors. In the lens cross-sectional views, the left side is a magnification side (an object side in an image-capturing optical system, and a screen side in a projection optical system for a projector), and the right side is a reduction side (an image side in the image-capturing optical system, and an original image side in the projection optical system for a projector).

FIGS. 1, 3, 5, and 7, FIGS. 9A to 9C, and FIGS. 11A to 11C are respective cross-sectional views of optical systems according to first to sixth embodiments of the present disclosure. The arrows illustrated in FIGS. 1, 3, 5, and 7 indicate the moving direction of the lenses in focusing from infinity to the closest distance.

Figure 1:
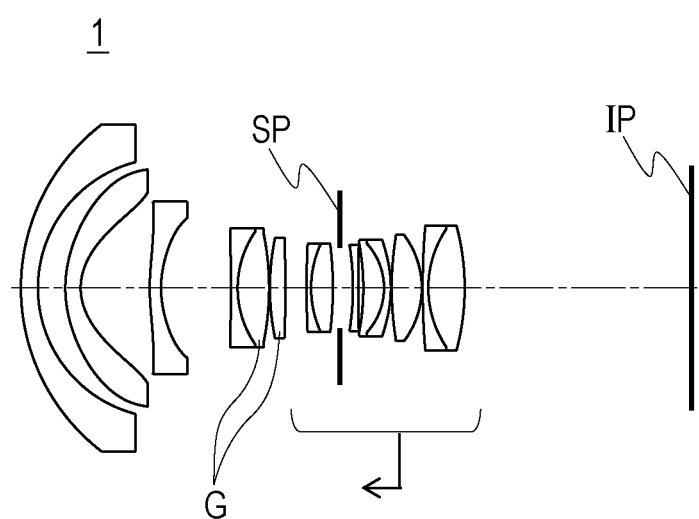
FIG. 1 is a cross-sectional view of an optical system according to a first embodiment of the present disclosure.
Figure 2:
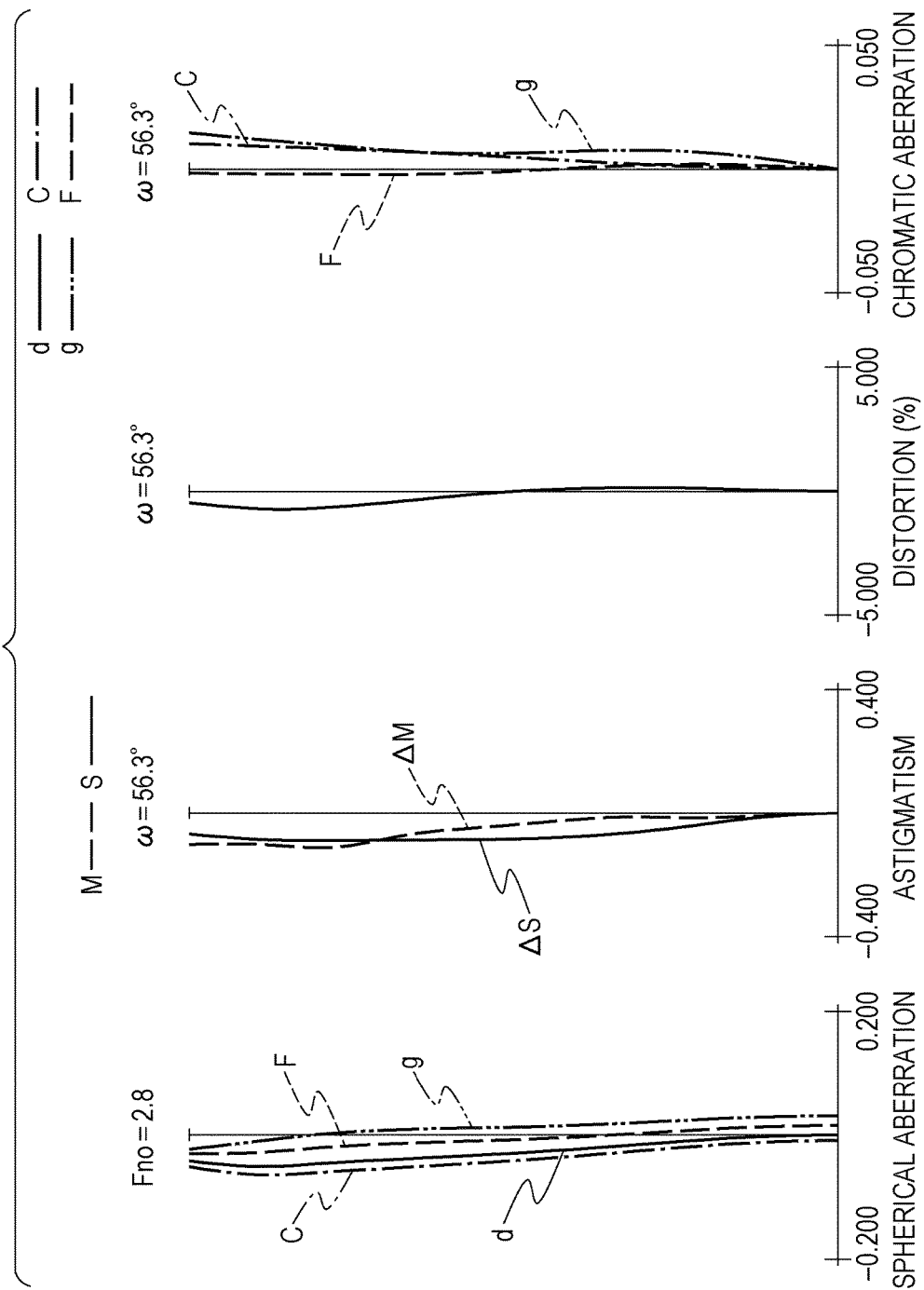
FIG. 2 is an aberration diagram of the optical system according to the first embodiment.
Figure 3:
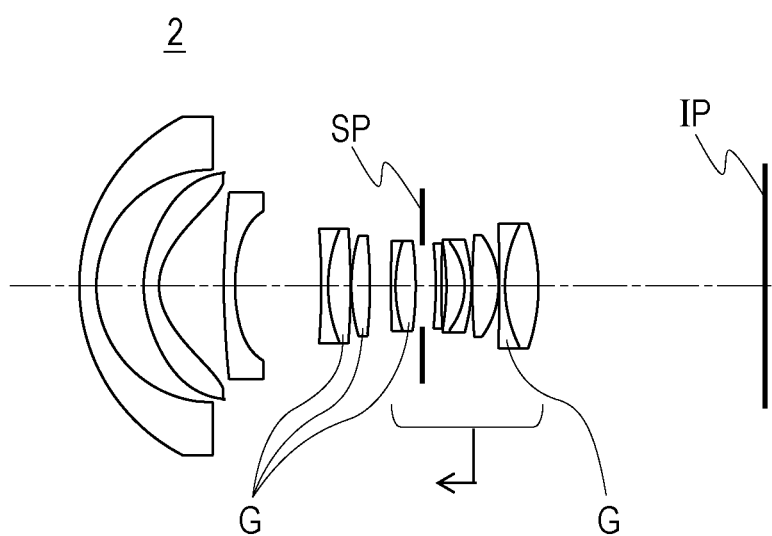
FIG. 3 is a cross-sectional view of an optical system according to a second embodiment of the present disclosure.
Figure 4:
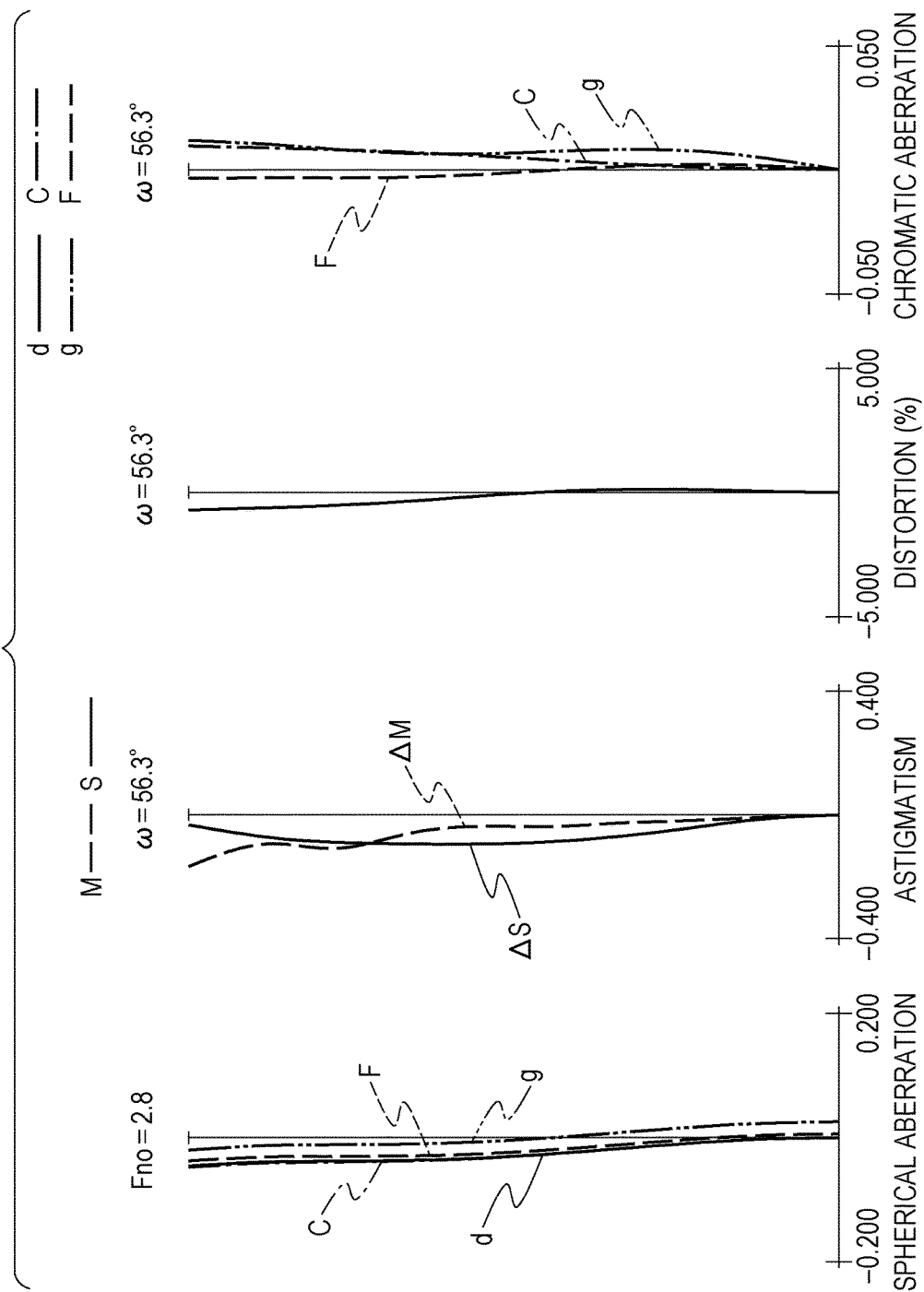
FIG. 4 is an aberration diagram of the optical system according to the second embodiment.
Figure 5:
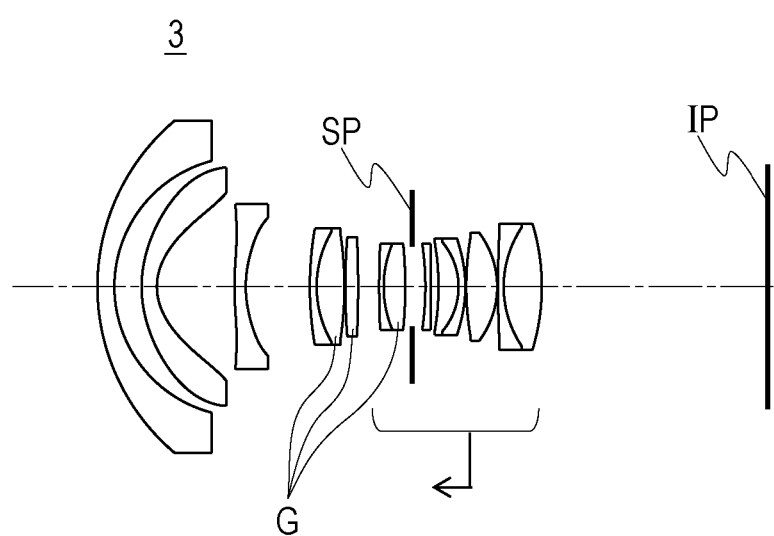
FIG. 5 is a cross-sectional view of an optical system according to a third embodiment of the present disclosure.
Figure 6:
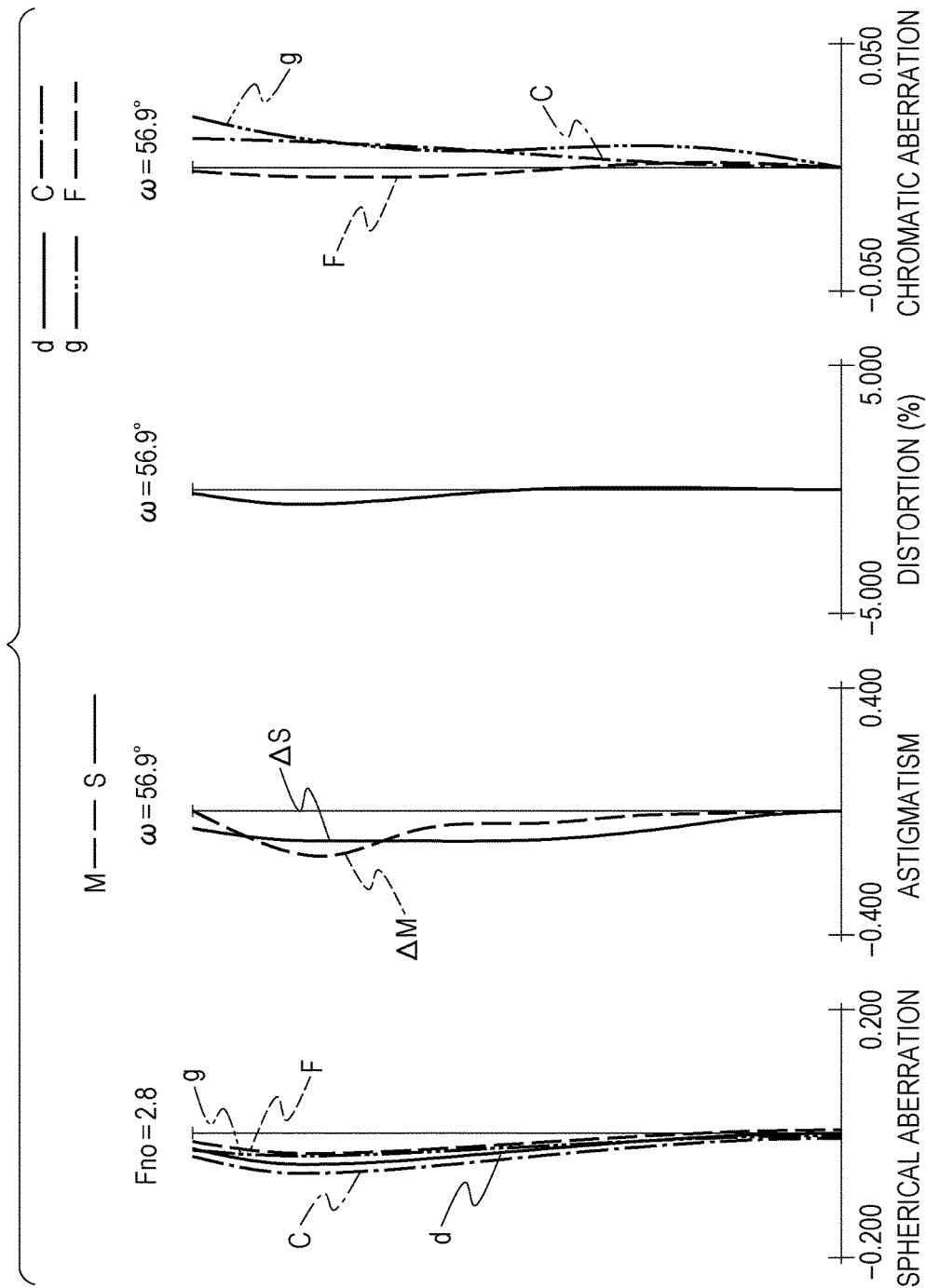
FIG. 6 is an aberration diagram of the optical system according to the third embodiment.
Figure 7:
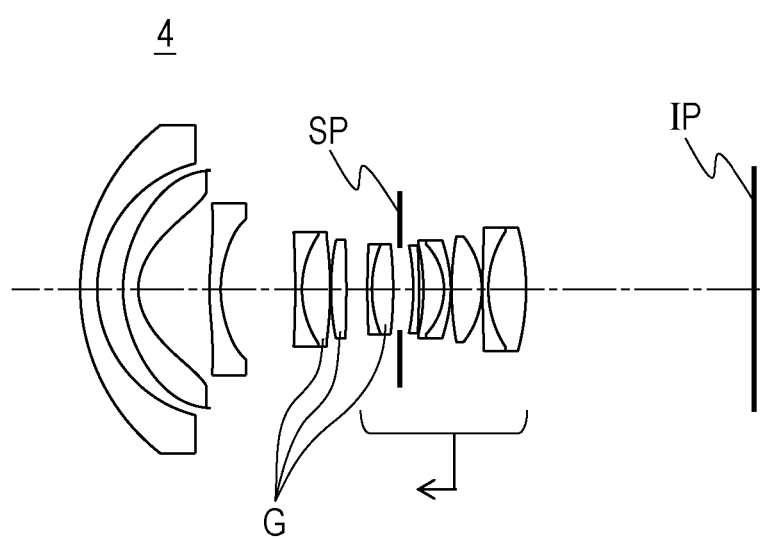
FIG. 7 is a cross-sectional view of an optical system according to a fourth embodiment of the present disclosure.
Figure 8:
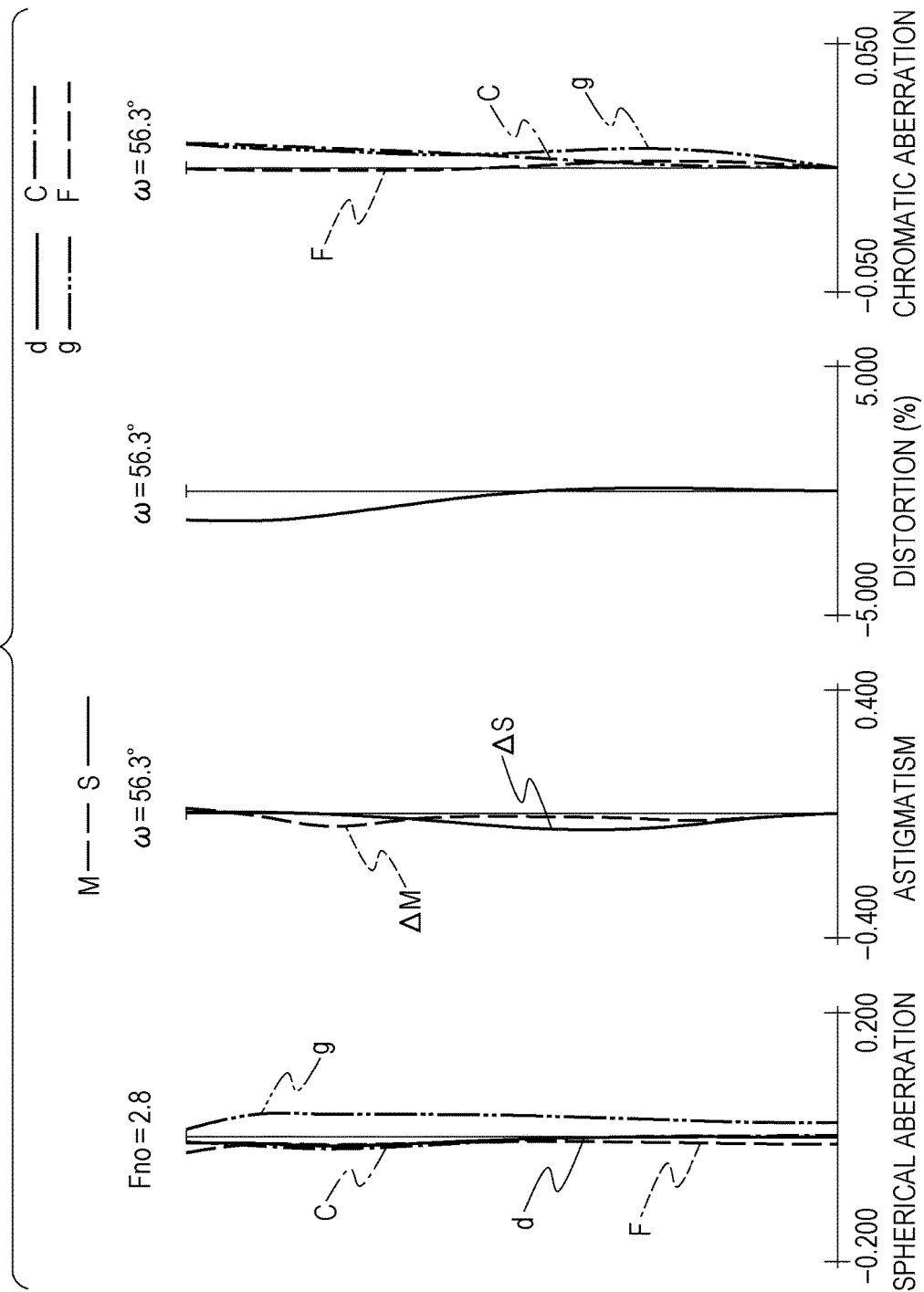
FIG. 8 is an aberration diagram of the optical system according to the fourth embodiment.
Figure 9A:
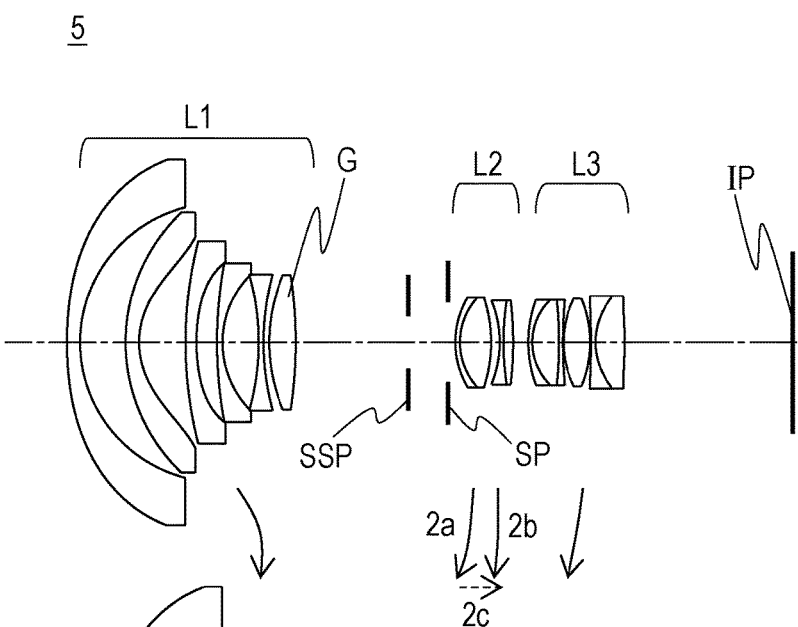
FIG. 9A is a cross-sectional view of an optical system according to a fifth embodiment of the present disclosure at a wide angle end.
Figure 9B:
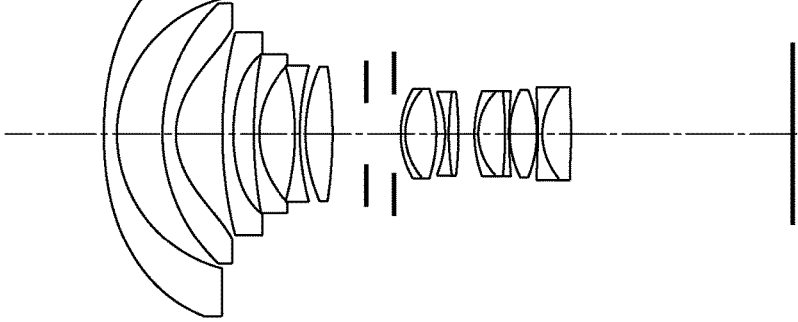
FIG. 9B is a cross-sectional view of the optical system according to the fifth embodiment at an intermediate zoom position.
Figure 9C:
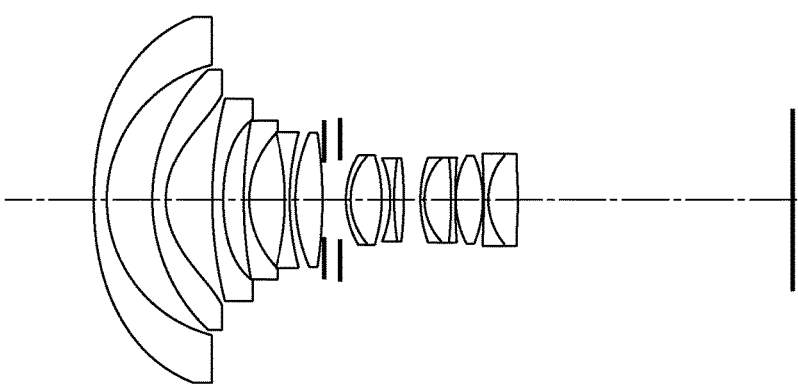
FIG. 9C is a cross-sectional view of the optical system according to the fifth embodiment at a telephoto end.

In FIGS. 9A to 9C, reference sign L1 denotes a first lens unit, L2 denotes a second lens unit, and L3 denotes a third lens unit. The number of lenses constituting each lens unit may be one or more. The arrows shown by the solid lines in FIG. 9A indicate the movement loci of the individual lens units in zooming from the wide angle end to the telephoto end. The arrow 2a for the second lens unit L2 indicates a movement locus in zooming from the wide angle end to the telephoto end during focusing on infinity. The arrow 2b indicates a movement locus in zooming from the wide angle end to the telephoto end during focusing on the closest distance. The arrow 2c (dotted line) for the second lens unit L2 indicates a moving direction in focusing from infinity to the closest distance.

Figure 11A:
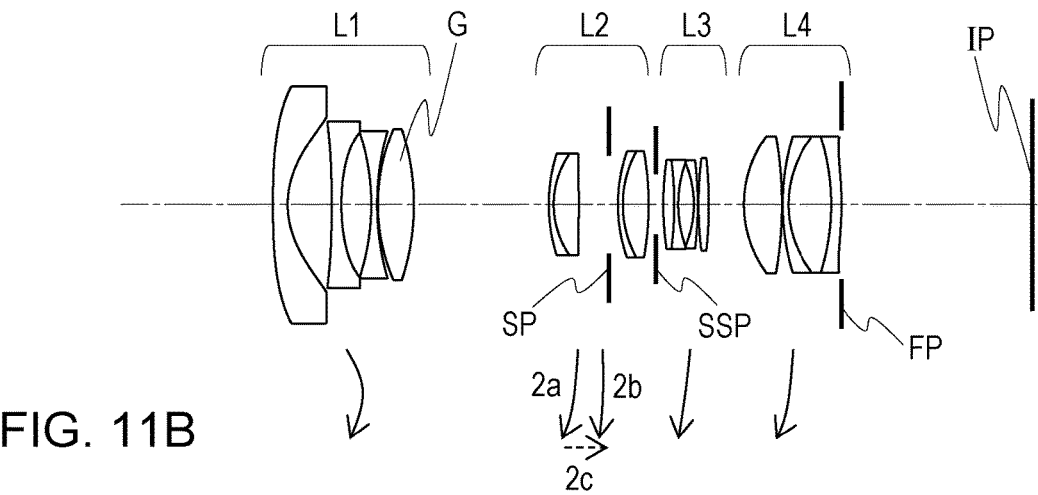
FIG. 11A is a cross-sectional view of an optical system according to a sixth embodiment of the present disclosure at a wide angle end.
Figure 11B:
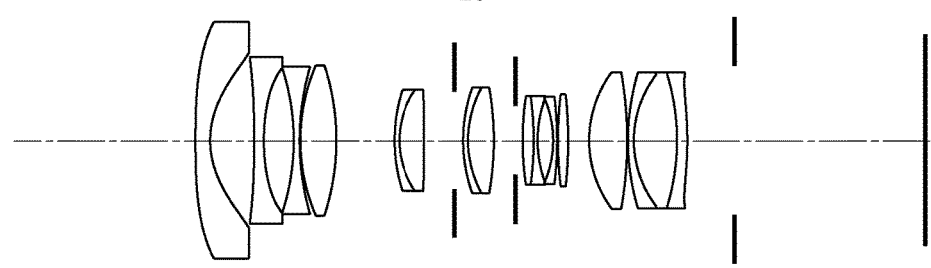
FIG. 11B is a cross-sectional view of the optical system according to the sixth embodiment at an intermediate zoom position.
Figure 11C:
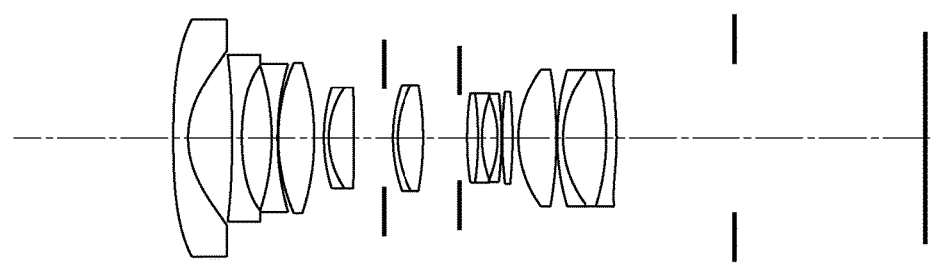
FIG. 11C is a cross-sectional view of the optical system according to the sixth embodiment at a telephoto end.

In FIGS. 11A to 11C, reference sign L1 denotes a first lens unit, L2 denotes a second lens unit, L3 denotes a third lens unit, and L4 denotes a fourth lens unit. The arrows shown by the solid lines in FIG. 11A indicate the movement loci of the individual lens units in zooming from the wide angle end to the telephoto end. The arrow 2a for the second lens unit L2 indicates a movement locus in zooming from the wide angle end to the telephoto end during focusing on infinity. The arrow 2b indicates a movement locus in zooming from the wide angle end to the telephoto end during focusing on the closest distance. The arrow 2c (dotted line) for the second lens unit L2 indicates a moving direction in focusing from infinity to the closest distance.

Reference sign SP in the cross-sectional views denotes an aperture stop, and IP denotes an image plane. When the optical systems according to the embodiments are used as image-capturing optical systems for video cameras or digital cameras, an image sensor, such as a CCD sensor or a CMOS sensor, is disposed on the image plane IP. When the optical systems according to the embodiments are used as image-capturing optical systems for silver-halide film cameras, film is disposed on the image plane IP. In FIGS. 9A and 11A, reference sign SSP denotes an auxiliary aperture stop that supplementally limits a beam of full aperture F-number (Fno). In FIG. 11A, reference sign FP denotes a flare-cut diaphragm that cuts undesirable light.

Figure 10B:
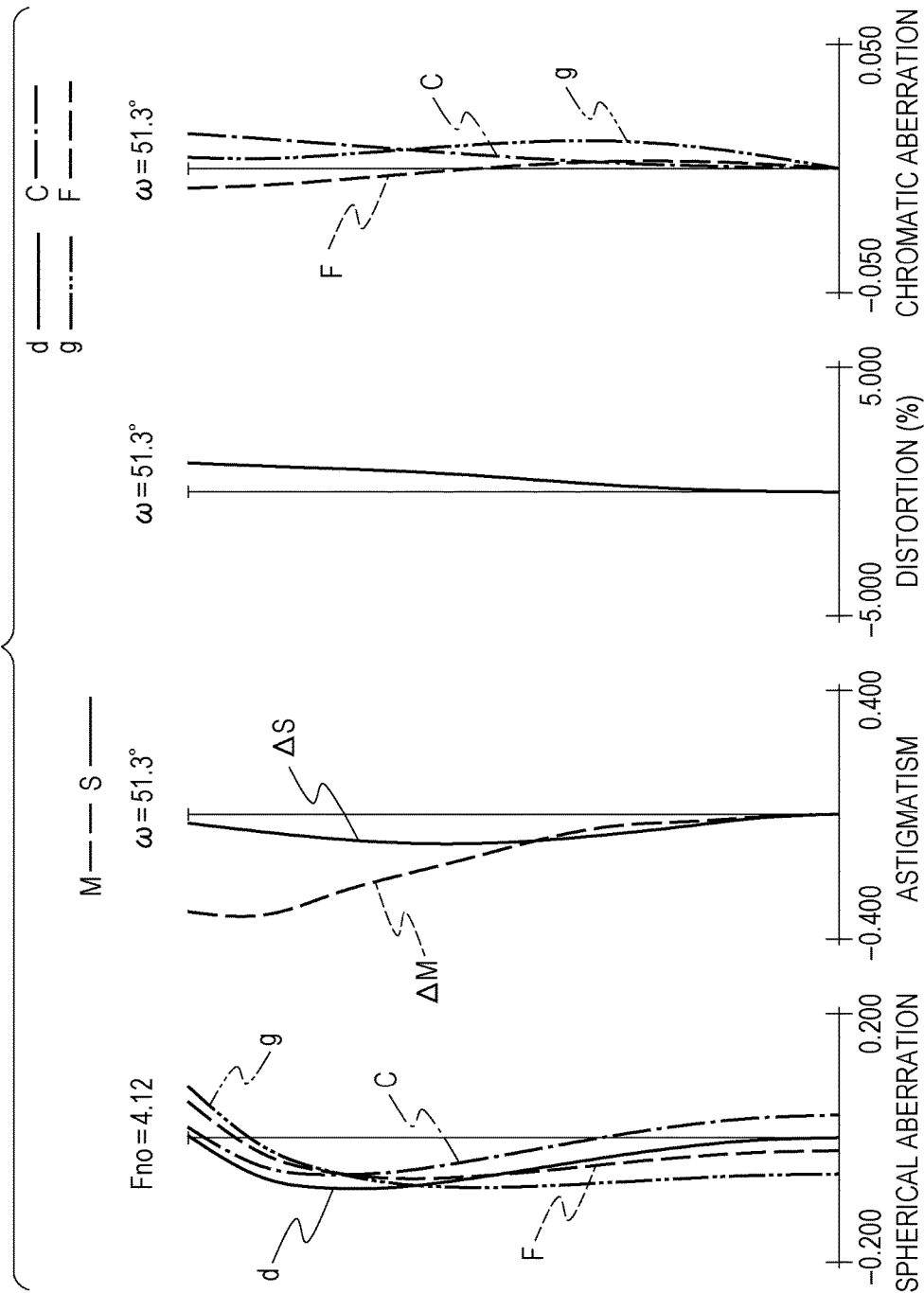
FIG. 10B is an aberration diagram of the optical system according to the fifth embodiment at an intermediate zoom position.
Figure 12B:
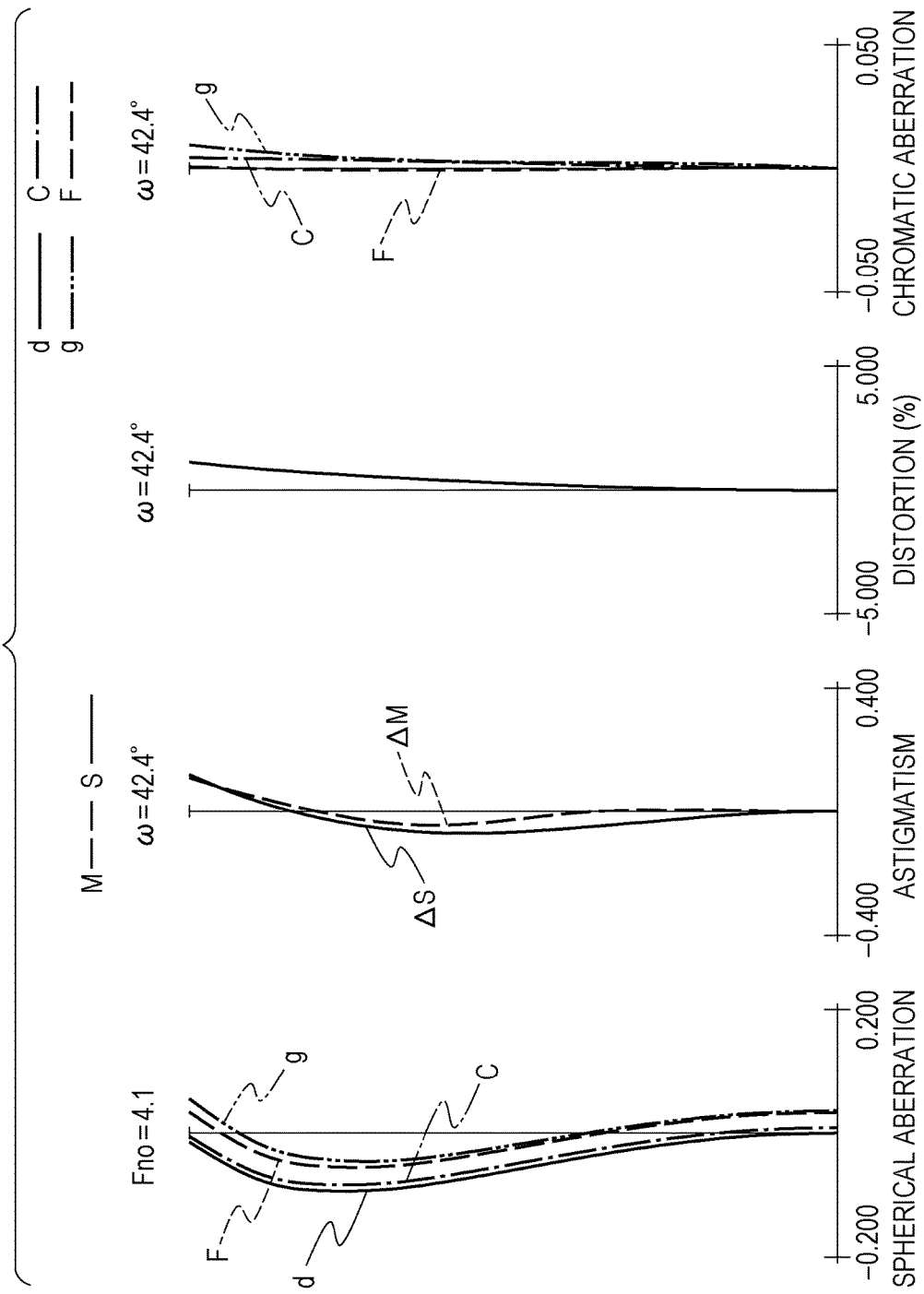
FIG. 12B is an aberration diagram of the optical system according to the sixth embodiment at an intermediate zoom position.

FIGS. 2, 4, 6, and 8, FIGS. 10A to 10C, and FIGS. 12A to 12C are respective aberration diagrams of the optical systems according to the first to sixth embodiments. FIGS. 10A and 12A are aberration diagrams at the wide angle end, FIGS. 10B and 12B are aberration diagrams at an intermediate zooming position, and FIGS. 10C and 12C are aberration diagrams at the telephoto end. In the aberration diagrams, reference sign Fno denotes F-number, and ω denotes a half angle of view (in degrees), which is an angle of view obtained by paraxial calculation. In the spherical aberration diagrams, reference sign d (solid line) denotes d-line (wavelength: 587.6 nm), g (two-dot chain line) denotes g-line (wavelength 435.8 nm), C (dashed-dotted line) is C-line (656.3 nm), and F (dashed line) denotes F-line (486.1 nm).

In the astigmatism diagrams, reference sign ΔS (solid line) denotes a sagittal image plane on the d-line, and ΔM (dashed line) denotes a meridional image plane on the d-line. The distortion is for the d-line. In the chromatic aberration of magnification diagrams, reference sign g (two-dot chain line) denotes g-line, C (dashed dotted line) denotes C-line, and F (dashed line) denoted F-line.

Figure 13:
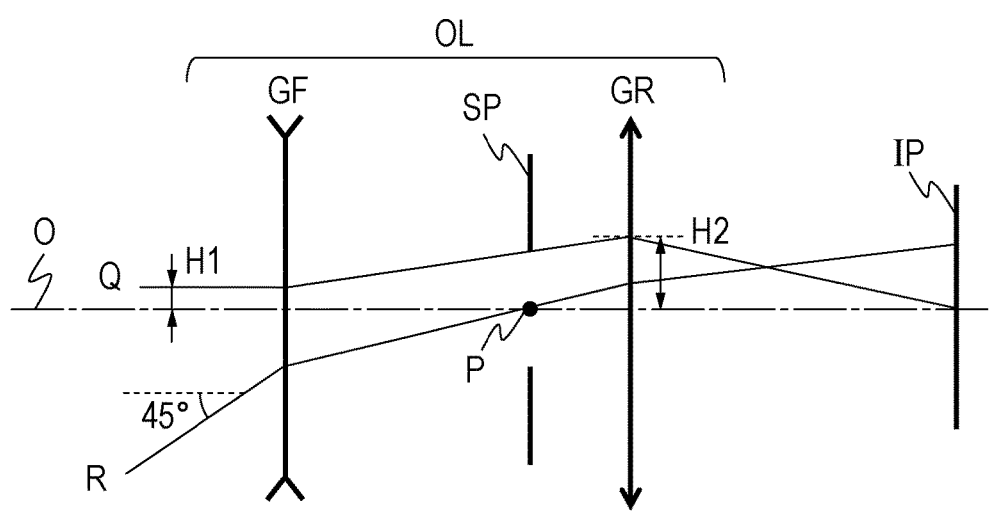
FIG. 13 is a schematic diagram of the paraxial refractive power arrangement of a retro focus type optical system.

Referring to FIG. 13, the optical systems of the embodiments will be described. The optical systems of the embodiments are optical systems in which the distance ("H1" in FIG. 13) from the optical axis ("O" in FIG. 13) to a position where a paraxial marginal ray enters the lens surface of a lens closest to the magnification side is smaller than the maximum value of the distance ("H2" in FIG. 13) from the optical axis to a position where the paraxial marginal ray enters the lens surface on the reduction side with respect to the intersection point P between the optical axis and the chief paraxial ray. Such optical systems are called "retro focus type optical systems".

FIG. 13 is a schematic diagram of the paraxial refractive power arrangement of a typical retro focus type optical system OL. In FIG. 13, reference sign GF denotes a front lens unit having negative refractive power, and GR denotes a rear lens unit having positive refractive power. In FIG. 13, reference sign Q denotes the paraxial marginal ray, and R denotes the chief paraxial ray.

The paraxial marginal ray is a paraxial ray that enters parallel to the optical axis of the optical system and having a height of 1 from the optical axis when the focal length of the entire optical system is normalized to 1. The chief paraxial ray is a paraxial ray passing through an intersection point P between the entrance pupil of the optical system OL and the optical axis out of rays incident at an angle of −45° with respect to the optical axis when the focal length of the entire optical system is normalized to 1. As for the incidence angle of the optical system, the clockwise direction is positive, and the counterclockwise direction is negative as measured from the optical axis. It is assumed that the object is on the left side of the optical system, and the light entering the optical system from the object side travels from the left side to the right side. In other words, in FIG. 13, the left is the magnification side (object side), and the right is the reduction side (image side).

The optical systems of the embodiments include at least one optical element G that satisfies the following conditional expressions (1) to (3). In the case where the optical element G is disposed on the magnification side with respect to the point P, the optical element G is a positive lens. In the case where the optical element G is disposed on the reduction side with respect to the point P, the optical element G is a negative lens. Providing the optical element G in the optical systems of the embodiments allows the chromatic aberration of magnification and the field curvature to be corrected well.

$$30 \leq \nu d \leq 40 \tag{1}$$

$$1.225 \leq [nd-(14.387/\nu d)] \leq 1.276 \tag{2}$$

$$0.4300 \leq [\theta gF-(2.9795/\nu d)] \leq 0.5010 \tag{3}$$

In Expressions (1) and (2), νd is the Abbe number of the optical element G for the d-line. In Expression (2), nd is the refractive index of the optical element G for the d-line. In Expression (3), θgF is the partial dispersion ratio of the optical element G for the g-line and the F-line.

The Abbe number νd is defined by Expression (4). The partial dispersion ratio θgF is defined by Expression (5).

$$\nu d = (nd-1)/(nF-nC) \tag{4}$$

$$\theta gF = (ng-Nd)/(nF-nC) \tag{5}$$

where ng, nF, nd, and nC are respectively the refractive indices of Fraunhofer line for the g-line, the F-line, the d-line, and the C-line.

Expressions. (1) to (3) show that the optical element G has high dispersive power, a low partial dispersion ratio, and a low refractive index. The reason why chromatic aberration of magnification and field curvature can be corrected using such an optical element G will be described.

An axial chromatic aberration coefficient $L(\lambda)$ and a chromatic aberration of magnification coefficient $T(\lambda)$ of the optical system at any wavelength $\lambda$ are given by Expressions (6) and (7).

$$L(\lambda)=\Sigma(hi^2 \cdot \varphi i/vi(\lambda)) \quad (6)$$

$$T(\lambda)=\Sigma(hi \cdot Hi \cdot \varphi i/vi(\lambda)) \quad (7)$$

where i is the number of the lens counted from the object side, $\Sigma$ represents taking the sum for I, hi is the incident height of the paraxial marginal ray on the i-th lens, Hi is the incident height of the chief paraxial ray on the i-th lens, $\varphi i$ is the refractive power of the i-th lens, $vi(\lambda)$ is a value defined by Expression (8) when the refractive index of the i-th lens is $ni(\lambda)$, and the designed wavelength is $\lambda 0$.

$$vi(\lambda)=(ni(\lambda 0)-1)/(ni(\lambda)-ni(\lambda 0)) \quad (8)$$

Expressions (6) and (7) show that the higher the dispersion, the greater the contribution of the lens to $L(\lambda)$ and $T(\lambda)$ is. This means that chromatic aberration can be controlled without exerting a significant influence on various aberrations other than chromatic aberration, such as spherical aberration, coma aberration, and astigmatism, from the viewpoint of aberration. In contrast, to correct chromatic aberration using a lens made of a low dispersion material, it is necessary to give the lens relatively large refractive power. However, even if the chromatic aberration can be corrected, various aberrations, such as spherical aberration, would be significantly changed. Accordingly, a high dispersion material may be used for correcting chromatic aberration.

Next, conditions necessary for correcting the chromatic aberration of a retro focus type optical system using an optical element made of a high dispersion material will be described.

In a retro focus type optical system, as illustrated in FIG. 13, $L(\lambda)$ exhibits a characteristic that the whole inclination is negative and convex upward with respect to the wavelength. $T(\lambda)$ also exhibits the characteristic that the whole inclination is negative and convex upward with respect to the wavelength. It is known that chromatic aberration of magnification is larger than axial chromatic aberration in an optical system with a short focal length, like the retro focus type. For that reason, an optical element G may be disposed in a retro focus type optical system to correct the chromatic aberration of magnification.

The chromatic aberration of magnification coefficient $T_G(\lambda)$ of a single optical element G is given by Expression (9).

$$T_G(\lambda)=h_G \cdot H_G \cdot \varphi_G/v_G(\lambda) \quad (9)$$

where $h_G$ is the incident height of the paraxial marginal ray in the optical element G, $H_G$ is the incident height of the chief paraxial ray in the optical element G, $\varphi_G$ is the refractive power of the optical element G, $v_G(\lambda)$ is a value given by Expression (10).

$$v_G(\lambda)=(n_G(\lambda)-1)/(n_G(\lambda)-n_G(\lambda 0)) \quad (10)$$

where $n_G(\lambda)$ is the refractive index of the optical element G at any wavelength $\lambda$, and $\lambda 0$ is a design wavelength.

The wavelength dependency of $1/v_G(\lambda)$ directly reflects the wavelength dependency of $n_G(\lambda)$. To correct the chromatic aberration of magnification in the retro focus type optical system, a change in $T_G(\lambda)$ due to the wavelength and a change in $T(\lambda)$ due to the wavelength may cancel each other.

Referring to FIG. 13, when the optical element G is disposed on the magnification side with respect to the point P (an intersection point between the chief paraxial ray and the optical axis), $H_G<0$ holds, and when the optical element G is disposed on the reduction side with respect to the point P, $H_G>0$ holds. In other words, whether the inclination of $T_G(\lambda)$ is positive or negative depends on the position of the optical element G and the sign of the refractive power of the optical element G.

Suppose a case where the optical element G is disposed on the magnification side with respect to the point P. If $\varphi_G>0$, the overall inclination of $T_G(\lambda)$ is positive and convex upward. In contrast, if $\varphi_G<0$, the overall inclination of $T_G(\lambda)$ is negative and convex downward.

Next, suppose a case where the optical element G is disposed on the reduction side with respect to the point P. If $\varphi_G>0$, the overall inclination of $T_G(\lambda)$ is negative and convex downward. In contrast, if $\varphi_G<0$, the overall inclination of $T_G(\lambda)$ is positive and convex upward.

As described above, to cancel a change in $T(\lambda)$ due to the wavelength using $T_G(\lambda)$, it is necessary to dispose the optical element G as a positive lens on the magnification side with respect to the point P or as a negative lens on the reduction side with respect to the point P.

However, since both of $T(\lambda)$ and $T_G(\lambda)$ have the upward convex characteristic at that time, it is difficult to completely cancel the change in $T(\lambda)$ due to the wavelength using $T_G(\lambda)$, so that chromatic aberration of magnification remains on the shorter wavelength side. However, when the optical element G has negative anomalous partial dispersibility, the wavelength dependency of $T_G(\lambda)$ on the shorter wavelength side can be reduced, which allows the chromatic aberration of magnification to be reduced in a wider wavelength range. Thus, to reduce chromatic aberration of magnification in a wider wavelength range, the optical element G may have negative anomalous partial dispersibility. The anomalous partial dispersibility is a characteristic in which partial dispersion characteristic is different from that of normal glass, and the negative anomalous partial dispersibility is a characteristic in which the partial dispersion characteristic on the shorter wavelength side is smaller than that of normal glass.

However, materials that exhibit high dispersion and negative anomalous partial dispersibility conventionally used tend to have a large refractive index. In correcting the chromatic aberration of magnification using such a known material, it is difficult to set the Petzval sum of the optical system to a value close to 0, so that it is difficult to correct the field curvature.

For that reason, the optical systems of the embodiments correct chromatic aberration of magnification and field curvature well by forming the optical element G with an optical material having a relatively small refractive index although having high dispersion and a low partial dispersion ratio.

Next, Conditional Expression (1) to (3) will be described.

Expression (1) relates to the Abbe number of the optical element G. When the dispersion is so small that the value of vd exceeds the upper limit in Conditional Expression (1), it is difficult to correct primary chromatic aberration using the optical element G. In contrast, when the dispersion is increased so that the value of vd falls below the lower limit, the transmittance of the optical element G will be decreased, and the environment resistance will be deteriorated.

To increase the effect of correcting the primary chromatic aberration, Expression (1) is preferably within the range of Expression (1a), and more preferably, within the range of Expression (1b).

$$31 \leq vd \leq 39.5 \quad (1a)$$

$$32 \leq vd \leq 38 \quad (1b)$$

Expression (2) is an expression that defines the relationship between the refractive index and the Abbe number of the optical element G. In the case where the optical element G is used as a positive lens, if the refractive index of the optical element G is increased so as to exceed the upper limit of Expression (2), it becomes difficult to correct the negative Petzval's sum. This makes it difficult to correct the field curvature. If the refractive index of the optical element G is so small as to fall below the lower limit, the curvature of the optical element G necessary for sufficiently correcting the chromatic aberration of magnification is increased, which makes it difficult to constitute a compact optical system.

In contrast, in the case where the optical element G is used as a negative lens, if the refractive index of the optical element G is increased so as to exceed the upper limit of Expression (2), the refractive power of the optical element G becomes too strong. Disposing an optical element having strong negative refractive power on the reduction side with respect to the point P leads to an increase in the size of the optical system, which is not desirable. When the refractive index of the optical element G is so small as to fall below the lower limit, it is difficult to correct the negative Petzval's sum. This makes it difficult to correct the field curvature.

To achieve both of correction of the field curvature and size reduction of the optical system in balance, Expression (2) is preferably within the range of Expression (2a), and more preferably, within the range of Expression (2b).

$$1.235 < [nd-(14.387/vd)] < 1.273 \quad (2a)$$

$$1.245 < [nd-(14.387/vd)] < 1.270 \quad (2b)$$

Conditional Expression. (3) relates to the negative anomalous partial dispersibility of the optical element G. When the anomalous partial dispersibility of the optical element G is so small as to exceed the upper limit of Expression (3), the secondary chromatic aberration cannot be sufficiently corrected by the optical element G. When the negative anomalous partial dispersibility is increased so as to fall below the lower limit, it is difficult to manufacture a glass material that satisfies Expressions (1) and (2).

To reduce the primary and secondary chromatic aberrations in a balanced manner, Expression (3) is preferably within the range of Expression (3a), and more preferably, within the range of Expression (3b).

$$0.4650 < [\theta gF-(2.9795/vd)] < 0.5005 \quad (3a)$$

$$0.4800 < [\theta gF-(2.9795/vd)] < 0.5000 \quad (3b)$$

An optical material that satisfies Expressions (1), (2), and (3) can be obtained by, for example, adding $ZrO_2$, alkali metal oxide, or the like to the basic ingredient of $SiO_2$—$Nb_2O_5$-based optical glass and melting it. For example, the $SiO_2$—$Nb_2O_5$ based optical glass disclosed in Japanese Patent Laid-Open No. 10-265238 and optical glass containing alkali metal disclosed in Japanese Patent Laid-Open No. 6-135738 are blended and mixed. Thereafter, the mixture is melted in a platinum crucible, is homogenized by stirring, is formed into a block shape, and is annealed to form optical glass that satisfies Expressions (1), (2), and (3).

Alternatively, glass with product name S-TIM27 (nd=1.63980, vd=34.5, θgF=0.5922) manufactured by Ohara Inc. and optical glass (nd=1.69072, vd=36.2, θgF=0.5775) according to a sixth embodiment of Japanese Patent Application Laid-Open No. 10-265238 may be mixed at a ratio of 2:3. Also in this case, a glass material (nd=1.67035, vd=35.5, θgF=0.5834) that satisfies Conditional Expression. (1), (2), and (3) can be obtained.

An optical element G that satisfies Expressions (1), (2), and (3) may be formed of a glass material. This is because the glass material is easier to manufacture than organic materials, such as resin. In the molding of the glass material, the thickness is less restricted compared with molding of resin or the like. For that reason, by forming the optical element G with the glass material, flexibility in designing the refractive power of the optical element G can be increased. Furthermore, glass materials have excellent environmental resistance against changes in humidity and temperature and sufficient hardness. This also allows the optical element G to be used as a lens nearest to the object side in the optical system.

Furthermore, the optical systems of the embodiments preferably satisfy one or more of Conditional Expressions (11) to (15).

$$1.0 < |fA|/f < 10 \quad (11)$$

$$-1.4 < (rpa+rpb)/(rpa-rpb) < 1.0 \quad (12)$$

$$0 < (rna+rnb)/(rna-rnb) < 1.5 \quad (13)$$

$$0.04 < |dA/fA| < 1.8 \quad (14)$$

$$0.7 < nP/nN < 1.0 \quad (15)$$

In Expression (11), f is the focal length of the entire optical system. In the case where the optical system is a zoom lens, f is the focal length of the entire system at the wide angle end. Sign fA is the focal length of the optical element G when a light-incident-side refracting surface and a light-exiting-side refracting surface of the optical element G are in contact with the air.

In Expression (12), rpa is the curvature radius on the object side of the optical element G disposed as a positive lens on the magnification side with respect to the point P, and rpb is the curvature radius on the image side.

In Expression (13), rna is the curvature radius on the object side of the optical element G disposed as a negative lens on the reduction side with respect to the point P, and rnb is the curvature radius on the image side.

In Expression (14), dA is a distance on the optical axis from a refracting surface of the optical element G adjacent to the aperture stop SP to the aperture stop SP. In the case where the optical system is a zoom lens, dA is a distance on the optical axis from a refracting surface of the optical element G at the wide angle end adjacent to the aperture stop SP to the aperture stop SP.

In Expression (15), nP is an average value of refractive indices of all the positive lenses of the optical system for the d-line, and nN is an average value of the refractive indices of all the negative lenses of the optical system for the d-line.

Expression (11) defines the relationship between the focal length of the optical element G and the focal length of the entire system. By satisfying Expression (11), a difference in field curvature for each wavelength can be reduced while correcting the chromatic aberration of magnification. In the case where the refractive power of the optical element G is so weak as to exceed the upper limit of Expression (11), it is difficult to sufficiently reduce primary chromatic aberration of magnification. Increasing the refractive power of the optical element G so as to fall below the lower limit of Expression (11) is advantageous in correcting the primary chromatic aberration, but is undesirable because it causes chromatic field curvature.

Expression (11) is preferably within the range of Expression (11a), and more preferably, within the range of Expression (11b).

$$1.2<|fA|/f<7.0 \qquad (11a)$$

$$1.4<|fA|/f<5.0 \qquad (11b)$$

Expression (12) relates to the shape factor of the optical element G when the optical element G is disposed on the magnification side with respect to the point P. In this case, the optical element G is a positive lens.

When the shape factor of the optical element G exceeds the upper limit, it is difficult to correct various aberrations including the chromatic aberration of magnification. In particular, this makes it difficult to well correct the secondary spectrum of chromatic aberration of magnification. When the shape factor of the optical element G falls below the lower limit, chromatic field curvature tends to occur, which is undesirable.

Furthermore, to correct the secondary spectrum of chromatic aberration while reducing spherical aberration, Expression (12) is preferably within the range of Expression (12a), and more preferably, within the range of Expression (12b).

$$-0.9<(rpa+rpb)/(rpa-rpb)<0 \qquad (12a)$$

$$-0.8<(rpa+rpb)/(rpa-rpb)<-0.1 \qquad (12b)$$

Expression (13) relates to the shape factor of the optical element G when the optical element G is disposed on the reduction side with respect to the point P. In this case, the optical element G is a negative lens.

When the shape factor of the optical element G exceeds the upper limit, it is difficult to well correct chromatic aberration, field curvature, coma aberration, and so on. When the shape factor of the optical element G is below the lower limit, distortion is increased, which is undesirable.

Expression (13) is preferably within the range of Expression (13a), and more preferably, within the range of Expression (13b).

$$0.5<(rna+rnb)/(rna-rnb)<1.2 \qquad (13a)$$

$$0.8<(rna+rnb)/(rna-rnb)<1.0 \qquad (13b)$$

Expression (14) relates to the position of the optical element G in the optical system. As expressed in Expression (9), the higher the incident height of the chief paraxial ray on the optical element G, the larger the effect of correcting the chromatic aberration of magnification with the optical element G is. When the optical element G is disposed close to the aperture stop SP so that |dA/fA| is below the lower limit of Expression (14), the incident height of the chief paraxial ray on the optical element G is too low. This makes it difficult to sufficiently correct the chromatic aberration of magnification. In contrast, disposing the optical element G apart from the aperture stop SP so that |dA/fA| exceeds the upper limit of Expression (14) is advantageous in correcting the chromatic aberration of magnification. However, this leads to an increase in the size of the optical system, which is not desirable.

Furthermore, to effectively correct the secondary spectrum of chromatic aberration of magnification, Expression (14) is preferably within the range of Expression (14a), and more preferably, within the range of Expression (14b).

$$0.1<|dA/fA|<1.5 \qquad (14a)$$

$$0.3<|dA/fA|<1.2 \qquad (14a)$$

Expression (15) relates to the ratio of the average value of the refractive indices of the negative lenses in the optical system to the average value of the refractive indices of the positive lenses. Disposing the optical element G in an optical system that satisfies Expression (15) allows the field curvature and chromatic aberration to be further reduced. When nP is so large as to exceed the upper limit of Expression (15), the range of selection of a material constituting the positive lens is decreased, so that the Abbe number of the positive lenses constituting the optical system becomes too small as a whole. This makes it difficult to sufficiently reduce the axial chromatic aberration.

In contrast, when nP is so small as to fall below the lower limit of Expression (15), the refractive indices of the positive lenses constituting the optical system become too small as a whole, and the Petzval's sum becomes too large in the positive direction. This makes it difficult to reduce the field curvature. If the field curvature is to be sufficiently reduced, the size of the optical system has to be increased.

Expression (15) is preferably within the range of Expression (15a), and more preferably, within the range of Expression (15b).

$$0.80<nP/nN<0.95 \qquad (15a)$$

$$0.85<nP/nN<0.92 \qquad (15b)$$

To further enhance the effect of correcting the chromatic aberration and field curvature using the optical element G, the optical element G may have relatively large refractive power. For that reason, when the optical element G is disposed on the magnification side with respect to the point P, the optical element G may be a lens having the strongest refractive power out of positive lenses disposed on the magnification side with respect to the point P.

When the optical element G is a positive lens disposed on the magnification side with respect to the point P, the optical element G may be disposed closest to the magnification side of all positive lenses of the optical system. This increases the incident height of the chief paraxial ray in the optical element G, further enhancing the effect of correcting the chromatic aberration of magnification using the optical element G.

In some embodiments, the optical system of the present disclosure includes a plurality of optical elements G that satisfy Expressions (1) to (3).

Next, first to sixth embodiments will be described.

In the first embodiment, a fifth lens and a sixth lens are optical elements G. In the second embodiment, a fifth lens, a sixth lens, an eighth lens, and a thirteenth lens are optical elements G. In the third embodiment, a fifth lens, a sixth lens, and an eighth lens are optical elements G. In the fourth embodiment, a fifth lens, a sixth lens, and an eighth lens are optical elements G. In the fifth embodiment, a sixth lens is the optical element G. In the sixth embodiment, a fourth lens is the optical element G.

In this manner, the optical systems of the embodiments correct chromatic aberration of magnification and field curvature well using at least one optical element G that satisfies Expressions (1) to (3).

The optical systems of the embodiments have at least one aspherical surface on the light-exiting side with respect to the aperture stop SP. Using the aspherical lens reduces field curvature and distortion that occur when the focal length is decreased.

Numerical Examples 1 to 5 corresponding to the first to fifth embodiments, respectively, will be shown below.

In surface data of the numerical examples, reference sign r denotes the curvature radius of each optical surface, and d (mm) denotes an on-axis interval (a distance on the optical axis) between an m-th surface and a (m+1)-th surface. where m is the number of the surface counted from the light incident side, nd is the refractive index of each optical member for the d-line, νd is the Abbe number of the optical member for the d-line, and θgF is the partial dispersion ratio of the optical member for the g-line and the F-line.

In the surface data of each numerical example, aspherical optical surfaces are each expressed as a surface number with * (asterisk). The aspherical data indicates the aspherical coefficient of each aspherical surface. In the aspherical coefficient, "e±A" denotes "×10$^{±A}$". The aspherical shape of each optical surface is expressed as Expression (17):

$$X = \frac{\frac{H^2}{R}}{1 + \sqrt{1 - (1+K)\left(\frac{H}{R}\right)^2}} + A4H^4 + A6H^6 + A8H^8 + A10H^{10} + A12H^{12} \quad (17)$$

where X is the amount of displacement from a surface apex in the optical axis direction, H is a height from the optical axis in a direction perpendicular to the optical axis, R is a paraxial curvature radius, K is a conic constant, and A4, A6, A8, A10, and A12 are aspherical coefficients.

In each numerical example, all of d, focal length (mm), F-number, and half angle of view (°) are values when the optical systems of the embodiments are focused on an object at infinity. Back focus BF is a distance from the final lens surface to the image plane. The overall lens length is a value obtained by adding the back focus to the distance from the first lens surface to the final lens surface.

Numerical Example 1 in mm

Surface Data

| Surface Number | r | d | nd | νd | θgF |
|---|---|---|---|---|---|
| 1 | 36.448 | 3.00 | 1.76385 | 48.51 | 0.5587 |
| 2 | 23.000 | 4.83 | | | |
| 3* | 21.101 | 2.70 | 1.58313 | 59.38 | 0.5423 |
| 4* | 9.927 | 12.19 | | | |
| 5* | 38.449 | 2.00 | 1.85400 | 40.39 | 0.5677 |
| 6* | 17.929 | 12.31 | | | |
| 7 | −430.152 | 1.20 | 1.53775 | 74.70 | 0.5392 |
| 8 | 17.577 | 5.55 | 1.62045 | 38.09 | 0.5779 |
| 9 | −48.493 | 0.15 | | | |
| 10 | 43.921 | 2.75 | 1.62606 | 39.09 | 0.5762 |
| 11 | −182.869 | 3.71 | | | |
| 12 | 168.625 | 0.80 | 1.90043 | 37.37 | 0.5774 |
| 13 | 18.788 | 3.84 | 1.65016 | 39.34 | 0.5753 |
| 14 | −65.093 | 1.21 | | | |
| 15 (aperture) | ∞ | 2.34 | | | |
| 16 | −47.378 | 1.00 | 1.88300 | 40.76 | 0.5667 |
| 17 | 1306.098 | 0.82 | | | |
| 18 | −42.383 | 3.66 | 1.49700 | 81.54 | 0.5375 |
| 19 | −11.720 | 1.20 | 1.85400 | 40.39 | 0.5677 |
| 20* | −22.232 | 0.15 | | | |
| 21 | 56.851 | 5.31 | 1.43875 | 94.66 | 0.5340 |
| 22 | −15.592 | 0.15 | | | |
| 23 | 132.948 | 1.00 | 1.83481 | 42.73 | 0.5648 |
| 24 | 18.773 | 6.42 | 1.49700 | 81.54 | 0.5375 |
| 25 | −42.507 | 40.00 | | | |
| Image plane | ∞ | | | | |

Aspherical Surface Data

Third surface

K = 0.00000e+000 A4 = −3.45572e−005 A6 = 1.15041e−007
A8 = −3.85640e−010 A10 = 6.81234e−013 A12 = −5.63414e−016

Fourth surface

K = −8.49104e−001 A4 = −2.80601e−005 A6 = 3.93352e−008
A8 = −7.32264e−011 A10 = −3.19787e−012 A12 = 6.12769e−015

Fifth surface

K = 0.00000e+000 A4 = −1.00092e−004 A6 = 3.62670e−007
A8 = −6.96743e−010 A10 = 4.80079e−013

Sixth surface

K = 0.00000e+000 A4 = −9.10091e−005 A6 = 5.67082e−007
A8 = −1.29096e−009 A10 = 5.84243e−012

Twelfth surface

K = 0.00000e+000 A4 = 2.34272e−005 A6 = 1.10645e−007
A8 = 1.14347e−010 A10 = 4.34297e−012

Various Data

| | |
|---|---|
| Focal length | 14.42 |
| F-number | 2.80 |
| Half angle of view (°) | 56.31 |
| Image height | 21.64 |
| Overall lens length | 118.28 |
| BF | 40.00 |

Numerical Example 2 in mm

Surface Data

| Surface Number | r | d | nd | νd | θgF |
|---|---|---|---|---|---|
| 1 | 33.615 | 3.00 | 1.76385 | 48.51 | 0.5587 |
| 2 | 20.582 | 8.35 | | | |
| 3* | 20.117 | 2.70 | 1.58313 | 59.38 | 0.5423 |
| 4* | 10.099 | 11.41 | | | |
| 5* | 69.306 | 2.00 | 1.85400 | 40.39 | 0.5677 |
| 6* | 28.441 | 15.23 | | | |
| 7 | −134.662 | 1.20 | 1.59522 | 67.74 | 0.5442 |
| 8 | 25.659 | 3.96 | 1.66565 | 35.64 | 0.5824 |
| 9 | −126.884 | 0.15 | | | |
| 10 | 31.440 | 3.28 | 1.63980 | 36.20 | 0.5778 |
| 11 | −80.745 | 3.71 | | | |
| 12 | 251.186 | 0.80 | 1.95375 | 32.32 | 0.5898 |
| 13 | 25.769 | 3.54 | 1.66446 | 35.89 | 0.5821 |
| 14 | −58.296 | 1.21 | | | |
| 15 (aperture) | ∞ | 2.34 | | | |
| 16 | −69.210 | 1.00 | 1.88300 | 40.76 | 0.5667 |
| 17 | 190.431 | 0.88 | | | |
| 18 | −43.908 | 3.22 | 1.43875 | 94.66 | 0.5340 |
| 19 | −12.541 | 1.20 | 1.88300 | 40.76 | 0.5667 |
| 20* | −25.829 | 0.15 | | | |
| 21 | 115.312 | 4.63 | 1.43875 | 94.66 | 0.5340 |
| 22 | −15.139 | 0.15 | | | |
| 23 | −314.470 | 1.00 | 1.66565 | 35.64 | 0.5824 |
| 24 | 23.876 | 5.91 | 1.49700 | 81.54 | 0.5375 |
| 25 | −34.030 | 40.00 | | | |
| Image plane | ∞ | | | | |

-continued in mm

Aspherical Surface Data

Third surface

K = 0.00000e+000 A4 = −4.75693e−005 A6 = 1.51883e−007
A8 = −4.15914e−010 A10 = 6.90035e−013 A12 = −5.66371e−016
Fourth surface K = −9.37643e−001 A4 = −4.74627e−005 A6 = 2.54143e−008
A8 = 1.00035e−010 A10 = −1.47607e−012 A12 = 2.28072e−015
Fifth surface K = 0.00000e+000 A4 = −5.54593e−005 A6 = 3.18312e−007
A8 = −7.90549e−010 A10 = 6.54371e−013
Sixth surface K = 0.00000e+000 A4 = −2.65910e−005 A6 = 5.40368e−007
A8 = −1.46102e−009 A10 = 6.24965e−012
Twelfth surface K = 0.00000e+000 A4 = 2.88270e−005 A6 = 8.88297e−008
A8 = 6.47407e−011 A10 = 6.11742e−013

Various Data

| | |
|---|---|
| Focal length | 14.42 |
| F-number | 2.80 |
| Half angle of view (°) | 56.31 |
| Image height | 21.64 |
| Overall lens length | 121.02 |
| BF | 40.00 |

Numerical Example 3 in mm

Surface Data

| Surface Number | r | d | nd | νd | θgF |
|---|---|---|---|---|---|
| 1 | 38.436 | 3.00 | 1.76385 | 48.51 | 0.5587 |
| 2 | 23.004 | 4.80 | | | |
| 3* | 21.233 | 2.70 | 1.58313 | 59.38 | 0.5423 |
| 4* | 9.902 | 13.69 | | | |
| 5* | 46.758 | 2.00 | 1.85400 | 40.39 | 0.5677 |
| 6* | 19.313 | 11.32 | | | |
| 7 | 60.894 | 1.20 | 1.59522 | 67.74 | 0.5442 |
| 8 | 19.410 | 4.90 | 1.68118 | 33.06 | 0.5908 |
| 9 | −62.013 | 0.15 | | | |
| 10 | 108.115 | 2.27 | 1.70771 | 31.16 | 0.5958 |
| 11 | −194.958 | 3.71 | | | |
| 12 | 161.557 | 0.80 | 1.95375 | 32.32 | 0.5898 |
| 13 | 19.606 | 3.81 | 1.65310 | 35.34 | 0.5844 |
| 14 | −78.070 | 1.21 | | | |
| 15 (aperture) | ∞ | 2.34 | | | |
| 16 | −52.273 | 1.00 | 1.88300 | 40.76 | 0.5667 |
| 17 | −440.628 | 1.32 | | | |
| 18 | −46.432 | 3.54 | 1.49700 | 81.54 | 0.5375 |
| 19 | −12.295 | 1.20 | 1.85400 | 40.39 | 0.5677 |
| 20* | −22.841 | 0.15 | | | |
| 21 | 51.289 | 5.47 | 1.43875 | 94.66 | 0.5340 |
| 22 | −15.934 | 0.15 | | | |
| 23 | 204.827 | 1.00 | 1.83481 | 42.73 | 0.5648 |
| 24 | 18.954 | 6.73 | 1.49700 | 81.54 | 0.5375 |
| 25 | −38.556 | 40.00 | | | |
| Image plane | ∞ | | | | |

Aspherical Surface Data

Third surface

K = 0.00000e+000 A4 = −3.10391e−005 A6 = 1.07476e−007
A8 = −3.86824e−010 A10 = 7.08395e−013 A12 = −5.98563e−016
Fourth surface K = −8.49734e−001 A4 = −2.22196e−005 A6 = 3.81498e−008
A8 = −5.43328e−011 A10 = −3.15367e−012 A12 = 6.02523e−015
Fifth surface K = 0.00000e+000 A4 = −1.00517e−004 A6 = 3.69420e−007
A8 = −6.86387e−010 A10 = 5.63681e−013
Sixth surface K = 0.00000e+000 A4 = −9.13570e−005 A6 = 5.52626e−007
A8 = −1.23223e−009 A10 = 5.40441e−012
Twelfth surface K = 0.00000e+000 A4 = 2.39290e−005 A6 = 9.72309e−008 A8 =
2.88703e−010 A10 = 3.04555e−012

Various Data

| | |
|---|---|
| Focal length | 14.10 |
| F-number | 2.80 |
| Half angle of view (°) | 56.90 |
| Image height | 21.64 |
| Overall lens length | 118.45 |
| BF | 40.00 |

Numerical Example 4 in mm

Surface Data

| Surface Number | r | d | nd | νd | θgF |
|---|---|---|---|---|---|
| 1 | 36.750 | 3.00 | 1.76385 | 48.51 | 0.5587 |
| 2 | 22.915 | 4.55 | | | |
| 3* | 21.053 | 2.70 | 1.58313 | 59.38 | 0.5423 |
| 4* | 10.016 | 12.55 | | | |
| 5* | 40.944 | 2.00 | 1.85400 | 40.39 | 0.5677 |
| 6* | 18.596 | 13.15 | | | |
| 7 | −195.058 | 1.20 | 1.53775 | 74.70 | 0.5392 |
| 8 | 17.308 | 4.97 | 1.65460 | 37.95 | 0.5675 |
| 9 | −67.789 | 0.14 | | | |
| 10 | 44.022 | 2.71 | 1.68690 | 35.00 | 0.5775 |
| 11 | −229.771 | 3.71 | | | |
| 12 | 162.641 | 0.80 | 2.00100 | 29.13 | 0.5997 |
| 13 | 21.071 | 3.75 | 1.72439 | 32.05 | 0.5867 |
| 14 | −68.351 | 1.21 | | | |
| 15 (aperture) | ∞ | 2.34 | | | |
| 16 | −40.162 | 1.00 | 1.88300 | 40.76 | 0.5667 |
| 17 | −138.794 | 0.80 | | | |
| 18 | −35.517 | 3.62 | 1.49700 | 81.54 | 0.5375 |
| 19 | −11.574 | 1.20 | 1.85400 | 40.39 | 0.5677 |
| 20* | −22.450 | 0.15 | | | |
| 21 | 52.889 | 5.32 | 1.43875 | 94.66 | 0.5340 |
| 22 | −15.051 | 0.15 | | | |
| 23 | 216.856 | 1.00 | 1.83481 | 42.73 | 0.5648 |
| 24 | 18.651 | 6.66 | 1.49700 | 81.54 | 0.5375 |
| 25 | −42.258 | 40.34 | | | |
| Image plane | ∞ | | | | |

Aspherical Surface Data

Third surface

K = 0.00000e+000 A4 = −3.39222e−005 A6 = 1.15818e−007
A8 = −3.91305e−010 A10 = 6.85923e−013 A12 = −5.62919e−016
Fourth surface K = −8.45900e−001 A4 = −2.77595e−005 A6 = 4.84791e−008
A8 = −6.40895e−011 A10 = −3.19547e−012 A12 = 6.00574e−015

-continued in mm

Fifth surface

K = 0.00000e+000 A4 = −9.88197e−005 A6 = 3.66580e−007
A8 = −6.91352e−010 A10 = 4.48188e−013
Sixth surface K = 0.00000e+000 A4 = −9.07798e−005 A6 = 5.84025e−007
A8 = −1.48230e−009 A10 = 6.98631e−012
Twelfth surface K = 0.00000e+000 A4 = 3.00543e−005 A6 = 1.15689e−007
A8 = 5.78362e−010 A10 = 2.86619e−012

Various Data

| | |
|---|---|
| Focal length | 14.44 |
| F-number | 2.80 |
| Half angle of view (°) | 56.28 |
| Image height | 21.64 |
| Overall lens length | 119.03 |
| BF | 40.34 |

Numerical Example 5 in mm

Surface Data

| Surface Number | r | d | nd | vd | θgF |
|---|---|---|---|---|---|
| 1* | 87.603 | 3.10 | 1.77250 | 49.60 | 0.5520 |
| 2 | 33.217 | 10.79 | | | |
| 3 | 42.810 | 3.20 | 1.58443 | 59.38 | 0.5435 |
| 4* | 19.626 | 11.01 | | | |
| 5 | 97.682 | 2.60 | 1.85000 | 40.30 | 0.5676 |
| 6* | 47.194 | 4.86 | | | |
| 7 | 104.629 | 1.30 | 1.59522 | 67.74 | 0.5442 |
| 8 | 23.066 | 8.57 | | | |
| 9 | −59.509 | 1.15 | 1.43875 | 94.93 | 0.5340 |
| 10 | 61.223 | 1.37 | | | |
| 11 | 40.311 | 6.40 | 1.67542 | 34.82 | 0.5825 |
| 12 | −108.552 | (variable) | | | |
| 13 | ∞ | (variable) | | | |
| 14 (aperture) | ∞ | (variable) | | | |
| 15 | 21.129 | 1.10 | 2.00100 | 29.13 | 0.5997 |
| 16 | 15.857 | 7.38 | 1.57501 | 41.50 | 0.5767 |
| 17 | −34.246 | 2.04 | | | |
| 18 | −26.178 | 0.90 | 1.91082 | 35.25 | 0.5824 |
| 19 | 66.959 | 2.28 | 1.80518 | 25.42 | 0.6161 |
| 20 | −88.600 | (variable) | | | |
| 21 | 29.229 | 0.95 | 1.88300 | 40.76 | 0.5667 |
| 22 | 14.163 | 6.33 | 1.51742 | 52.43 | 0.5564 |
| 23 | −97.098 | 0.95 | 1.83481 | 42.71 | 0.5642 |
| 24 | 118.211 | 0.15 | | | |
| 25 | 22.677 | 6.42 | 1.49700 | 81.54 | 0.5375 |
| 26 | −27.390 | 0.20 | | | |
| 27 | −192.943 | 1.10 | 1.88300 | 40.76 | 0.5667 |
| 28 | 16.497 | 7.00 | 1.58313 | 59.38 | 0.5423 |
| 29* | −89.286 | (variable) | | | |
| Image plane | ∞ | | | | |

Aspherical Surface Data

First surface

K = 0.00000e+000 A4 = 3.97453e−006 A6 = −2.37157e−009
A8 = 9.73394e−013 A10 = 5.48083e−016 A12 = −5.93036e−019
Fourth surface K = −2.84288e+000 A4 = 3.47741e−005 A6 = −5.87416e−008
A8 = 1.59940e−011 A10 = 1.01888e−014

-continued in mm

Sixth surface

K = 0.00000e+000 A4 = 1.10700e−005 A6 = 1.28647e−009
A8 = 1.56313e−010 A10 = −5.47642e−013 A12 = 8.66625e−016
Twenty-Ninth Surface K = 0.00000e+000 A4 = 1.99813e−005 A6 = 3.27109e−008
A8 = 2.40000e−011 A10 = −1.17564e−013 A12 = 6.20995e−015

Various Data
Zoom ratio 2.05

| | Wide angle end | Intermediate point | Telephoto end |
|---|---|---|---|
| Focal length | 11.33 | 17.31 | 23.28 |
| F-number | 4.12 | 4.12 | 4.12 |
| Half angle of view (°) | 62.36 | 51.33 | 42.90 |
| Image height | 21.64 | 21.64 | 21.64 |
| Overall lens length | 172.46 | 163.72 | 166.12 |
| BF | 39.87 | 52.66 | 65.44 |
| d12 | 26.65 | 7.99 | 0.46 |
| d13 | 9.51 | 6.65 | 3.79 |
| d14 | 1.68 | 1.50 | 1.33 |
| d20 | 3.60 | 3.77 | 3.95 |
| d29 | 39.87 | 52.66 | 65.44 |

Zoom-Lens-Unit Data

| Unit | First surface | Focal length |
|---|---|---|
| 1 | 1 | −18.24 |
| 2 | 15 | 71.82 |
| 3 | 21 | 56.70 |

Numerical Example 6 in mm

Surface Data

| Surface Number | r | d | nd | vd | θgF |
|---|---|---|---|---|---|
| 1* | 238.186 | 3.00 | 1.69350 | 53.18 | 0.5482 |
| 2* | 18.288 | 8.96 | | | |
| 3* | −283.923 | 2.00 | 1.85135 | 40.10 | 0.5695 |
| 4* | 45.762 | 6.08 | | | |
| 5 | −48.208 | 1.20 | 1.59282 | 68.63 | 0.5446 |
| 6 | 54.748 | 0.15 | | | |
| 7 | 39.219 | 7.34 | 1.66565 | 35.64 | 0.5824 |
| 8 | −49.667 | (variable) | | | |
| 9 | 34.186 | 1.00 | 1.91082 | 35.25 | 0.5824 |
| 10 | 18.284 | 5.10 | 1.67003 | 47.23 | 0.5627 |
| 11 | −472.910 | 6.15 | | | |
| 12 (aperture) | ∞ | (variable) | | | |
| 13 | 32.593 | 1.00 | 1.84666 | 23.93 | 0.6199 |
| 14 | 22.764 | 5.26 | 1.48749 | 70.23 | 0.5300 |
| 15 | −61.448 | (variable) | | | |
| 16 | ∞ | 1.51 | | | |
| 17 | 63.346 | 2.24 | 1.84666 | 23.78 | 0.6205 |
| 18 | −68.675 | 0.80 | 1.88300 | 40.76 | 0.5667 |
| 19 | 25.377 | 3.18 | | | |
| 20 | −21.957 | 0.80 | 1.91082 | 35.25 | 0.5824 |
| 21 | −72.073 | 0.15 | | | |
| 22 | 77.379 | 2.10 | 1.80810 | 22.76 | 0.6307 |
| 23 | 89.198 | (variable) | | | |
| 24 | 23.686 | 7.76 | 1.43875 | 94.66 | 0.5340 |
| 25 | −80.530 | 0.15 | | | |
| 26 | 48.782 | 1.20 | 2.00100 | 29.13 | 0.5997 |
| 27 | 22.277 | 8.80 | 1.49700 | 81.54 | 0.5375 |
| 28 | −46.752 | 2.10 | 1.85400 | 40.39 | 0.5677 |
| 29* | −66.921 | (variable) | | | |
| 30 | ∞ | 39.00 | | | |
| Image plane | ∞ | | | | | in mm

Aspherical Surface Data

First surface

K = 0.00000e+000 A4 = 1.26751e-005 A6 = -2.77055e-008
A8 = 5.49428e-011 A10 = -5.55796e-014 A12 = 2.69150e-017

Second surface

K = -5.87708e-001 A4 = -7.77802e-006 A6 = -1.13780e-008
A8 = -1.16266e-010 A10 = 1.36206e-013

Third surface

K = 0.00000e+000 A4 = -2.54676e-006 A6 = -4.53702e-008
A8 = 2.11119e-010 A10 = -2.53349e-013

Fourth surface

K = -1.24896e+001 A4 = 3.51162e-005 A6 = -6.21387e-008
A8 = 3.34084e-010 A10 = -9.25407e-014

Twenty Ninth surface

K = 1.31413e+001 A4 = 2.29275e-005 A6 = 3.23228e-008
A8 = 1.42688e-010 A10 = -4.37782e-013 A12 = 2.70504e-015

Various Data
Zoom ratio 2.07

| | Wide angle end | Intermediate point | Telephoto end |
|---|---|---|---|
| Focal length | 16.48 | 23.72 | 34.13 |
| F-number | 4.10 | 4.10 | 4.10 |
| Half angle of view (°) | 52.70 | 42.37 | 32.37 |
| Image height | 21.64 | 21.64 | 21.64 |
| Overall lens length | 155.12 | 149.11 | 153.61 |
| BF | 39.00 | 39.00 | 39.00 |
| d8 | 27.61 | 11.87 | 1.95 |
| d15 | 1.48 | 4.36 | 7.45 |
| d23 | 7.16 | 4.27 | 1.18 |
| d29 | 0.00 | 9.74 | 24.16 |

Zoom-Lens-Unit Data

| Unit | First surface | Focal length |
|---|---|---|
| 1 | 1 | -22.15 |
| 2 | 9 | 33.97 |
| 4 | 16 | -33.87 |
| 5 | 24 | 38.95 |

Table 1 shows a summary of the various numerical values in the numerical examples.

TABLE 1

| | EXAMPLE 1 | | EXAMPLE 2 | | | | EXAMPLE 3 | | |
|---|---|---|---|---|---|---|---|---|---|
| | f | | | | | | | | |
| | 14.422 | | 14.421 | | | | 14.101 | | |
| LENS NO. | 5 | 6 | 5 | 6 | 8 | 13 | 5 | 6 | 8 |
| (1) νd | 38.09 | 39.09 | 35.64 | 36.20 | 35.89 | 35.64 | 33.06 | 31.16 | 35.34 |
| nd | 1.62045 | 1.62606 | 1.66565 | 1.6398 | 1.66446 | 1.66565 | 1.68118 | 1.70771 | 1.65310 |
| (2) nd − 14.387/νd | 1.2427 | 1.2580 | 1.2620 | 1.2427 | 1.2636 | 1.2620 | 1.2460 | 1.2460 | 1.2460 |
| θgF | 0.5779 | 0.5762 | 0.5824 | 0.5778 | 0.5821 | 0.5824 | 0.5908 | 0.5958 | 0.5844 |
| (3) θgF − 2.9795/νd | 0.4997 | 0.5000 | 0.4988 | 0.4955 | 0.4991 | 0.4988 | 0.5007 | 0.5002 | 0.5001 |
| fA | 21.388 | 56.834 | 32.399 | 35.776 | 27.354 | -33.298 | 22.245 | 98.576 | 24.370 |
| (11) \|fA\|/f | 1.483 | 3.941 | 2.247 | 2.481 | 1.897 | 2.309 | 1.578 | 6.991 | 1.728 |
| rpa | 17.577 | 46.921 | 25.659 | 31.440 | 25.769 | — | 19.410 | 108.115 | 19.606 |
| rpb | -48.493 | -182.869 | -126.884 | -80.745 | -58.296 | — | -62.013 | -194.958 | -78.070 |
| (12) (rpa + rpb)/(rpa − rpb) | -0.468 | -0.592 | -0.664 | -0.439 | -0.387 | — | -0.523 | -0.287 | -0.599 |
| rna | — | — | — | — | — | -314.470 | — | — | — |
| rnb | — | — | — | — | — | 23.876 | — | — | — |
| (13) (rna + rnb)/(rna − rnb) | — | — | — | — | — | 0.859 | — | — | — |
| dA | 12.458 | 9.562 | 12.696 | 9.269 | 1.210 | 13.566 | 11.953 | 9.538 | 1.210 |
| (14) \|dA/fA\| | 0.582 | 0.168 | 0.392 | 0.259 | 0.044 | 0.407 | 0.537 | 0.097 | 0.050 |
| nN | 1.77637 | | 1.77270 | | | | 1.790 | | |
| nP | 1.55538 | | 1.55740 | | | | 1.579 | | |
| (15) nP/nN | 0.876 | | 0.879 | | | | 0.882 | | |

| | EXAMPLE 4 | | | EXAMPLE 5 | EXAMPLE 6 |
|---|---|---|---|---|---|
| | f | | | | |
| | 14.438 | | | 11.330 | 16.484 |
| LENS NO. | 5 | 6 | 8 | 6 | 4 |
| (1) νd | 37.95 | 35.00 | 32.05 | 34.82 | 35.64 |
| nd | 1.65460 | 1.68690 | 1.72439 | 1.67542 | 1.66565 |
| (2) nd − 14.387/νd | 1.2755 | 1.2758 | 1.2755 | 1.2622 | 1.2620 |
| θgF | 0.5675 | 0.5775 | 0.5867 | 0.5825 | 0.5824 |
| (3) θgF − 2.9795/νd | 0.4890 | 0.4924 | 0.4937 | 0.4969 | 0.4988 |
| fA | 21.562 | 54.002 | 22.633 | 44.289 | 34.046 |
| (11) \|fA\|/f | 1.493 | 3.740 | 1.568 | 3.909 | 2.065 |
| rpa | 17.308 | 44.022 | 21.071 | 40.311 | 39.219 |
| rpb | -67.789 | -229.771 | -68.351 | -108.552 | -49.667 |

TABLE 1-continued

| | | | | | | |
|---|---|---|---|---|---|---|
| (12) (rpa + rpb)/(rpa − rpb) | −0.593 | −0.678 | −0.529 | −0.458 | −0.118 |
| rna | — | — | — | — | — |
| rnb | — | — | — | — | — |
| (13) (rna + rnb)/(rna − rnb) | — | — | — | — | — |
| dA | 12.332 | 9.477 | 1.210 | 36.156 | 39.863 |
| (14) \|dA/fA\| | 0.572 | 0.176 | 0.053 | 0.816 | 1.171 |
| nN | | 1.789 | | 1.775 | 1.838 |
| nP | | 1.583 | | 1.609 | 1.631 |
| (15) nP/nN | | 0.885 | | 0.906 | 0.887 |

Optical Apparatus

Figure 14:
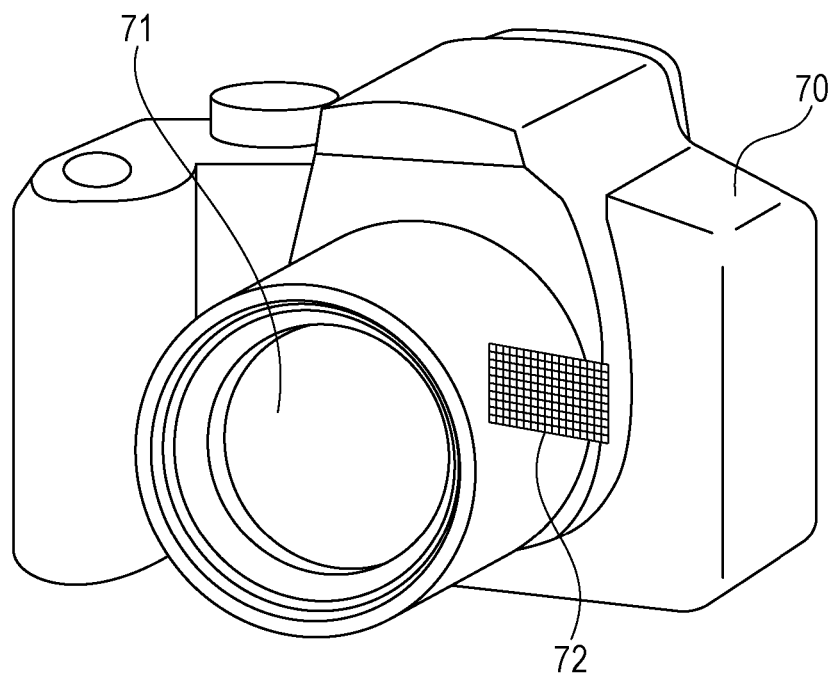
FIG. 14 is a schematic diagram of an image pickup apparatus according to an embodiment of the present disclosure.

FIG. 14 is a schematic diagram of an image pickup apparatus (a digital still camera) 100, which is an optical apparatus according to an embodiment of the present disclosure. The image pickup apparatus 100 of the present embodiment includes a camera main body 70, an optical system 71 according to any one of the first to sixth embodiments described above, and a light receiving element (an image sensor) 72 that photoelectrically converts an image formed by the optical system 71.

Since the image pickup apparatus 100 of the present embodiment includes the optical system 71 according to any one of the first to sixth embodiments, it is possible to obtain a high-quality image in which chromatic aberration of magnification and field curvature are well corrected. Examples of the light receiving element 72 include image sensors, such as a CCD sensor and a CMOS sensor. By electrically correcting various aberrations, such as distortion and chromatic aberration, of the image obtained by the light receiving element 72, the image quality of the output image can be improved.

The optical systems of the above embodiments can be used not only in the digital still camera illustrated in FIG. 14 but also in various optical apparatuses, such as a silver-halide film camera, a video camera, a projector, and a telescope.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2016-193119 filed Sep. 30, 2016, which is hereby incorporated by reference herein in its entirety.

What is claimed is:

1. An optical system in which a distance from a position where a paraxial marginal ray enters a lens surface closest to a magnification side to an optical axis is smaller than a maximum value of a distance from a position where the paraxial marginal ray enters a lens surface on a reduction side with respect to an intersection point P between the optical axis and a chief paraxial ray to the optical axis, the optical system comprising:
an optical element,
wherein following conditional expressions are satisfied:

$$30 \leq vd \leq 40$$

$$1.225 \leq [nd - (14.387/vd)] \leq 1.276$$

$$0.4300 \leq [\theta gF - (2.9795/vd)] \leq 0.5010$$

where $vd$ is Abbe number of the optical element, $\theta gF$ is a partial dispersion ratio of the optical element for g-line and F-line, and $nd$ is a refractive index of the optical element for d-line, wherein, when the optical element is disposed on the magnification side with respect to the point P, the optical element is a positive lens, and
wherein, when the optical element is disposed on the reduction side with respect to the point P, the optical element is a negative lens.

2. The optical system according to claim 1, wherein a following conditional expression is satisfied:

$$1.0 < |fA|/f < 10$$

where f is a focal length of the optical system, and fA is a focal length of the optical element.

3. The optical system according to claim 1,
wherein the optical element is a positive lens disposed on the magnification side with respect to the point P, and
wherein a following conditional expression is satisfied:

$$-1.4 < (rpa + rpb)/(rpa - rpb) < 1.0$$

where rpa is a curvature radius of a refracting surface of the optical element on an object side, and rpb is a curvature radius of a refracting surface of the optical element on an image side.

4. The optical system according to claim 1,
wherein the optical element is a negative lens disposed on the reduction side with respect to the point P, and
wherein a following conditional expression is satisfied:

$$0 < (rna + rnb)/(rna - rnb) < 1.5$$

where rna is a curvature radius of a refracting surface of the optical element on an object side, and rnb is a curvature radius of a refracting surface of the optical element on an image side.

5. The optical system according to claim 1, further comprising:
one or more positive lenses disposed on the magnification side with respect to the point P,
wherein a positive lens having the largest refractive power among all positive lenses disposed on the magnification side with respect to the point P is the optical element.

6. The optical system according to claim 1, further comprising:
one or more positive lenses disposed on the magnification side with respect to the point P,
wherein a positive lens disposed on most magnification side of all positive lenses disposed on the magnification side with respect to the point P is the optical element.

7. The optical system according to claim 1, further comprising an aperture stop,
wherein a following conditional expression is satisfied:

$$0.04 < |dA/fA| < 1.8$$

where fA is a focal length of the optical element, and dA is a distance on the optical axis from the aperture stop to a refracting surface of the optical element adjacent to the aperture stop.

8. The optical system according to claim 1, further comprising:
one or more negative lenses; and
one or more positive lenses,
wherein a following conditional expression is satisfied:

$$0.7 < nP/nN < 1.0$$

where nN is an average value of refractive indices of all negative lenses included in the optical system, and nP is an average value of refractive indices of all positive lenses included in the optical system.

9. The optical system according to claim 1, further comprising an aperture stop,
wherein a lens unit disposed on a light-exiting side with respect to the aperture stop comprises a lens having an aspherical surface.

10. The optical system according to claim 1, wherein the optical element is made of a glass material.

11. An optical apparatus comprising:
the optical system according to claim 1; and
an image sensor configured to receive an image formed by the optical system.

* * * * *